US008271440B2

(12) United States Patent
Matsuzawa et al.

(10) Patent No.: US 8,271,440 B2
(45) Date of Patent: Sep. 18, 2012

(54) APPARATUS, METHOD AND PROGRAM FOR REFRESHING A SUMMARY TABLE

(75) Inventors: Hirofumi Matsuzawa, Sagamihara (JP); Masahiro Ohkawa, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 11/876,520

(22) Filed: Oct. 22, 2007

(65) Prior Publication Data

US 2008/0086449 A1 Apr. 10, 2008

(30) Foreign Application Priority Data

Dec. 7, 2006 (JP) .................................. 2006-331213

(51) Int. Cl.
*G06F 7/00* (2006.01)

(52) U.S. Cl. ....................................... 707/625; 707/717

(58) Field of Classification Search ........................ None
See application file for complete search history.

(56) References Cited

U.S. PATENT DOCUMENTS

| | | | | |
|---|---|---|---|---|
| 6,353,828 | B1 * | 3/2002 | Ganesh et al. .................. | 707/8 |
| 6,882,993 | B1 * | 4/2005 | Lawande et al. ................ | 707/2 |
| 6,952,692 | B1 * | 10/2005 | Bhattiprolu et al. ............. | 707/3 |
| 7,321,898 | B1 * | 1/2008 | Luo et al. ........................ | 707/102 |
| 2004/0193622 | A1 * | 9/2004 | Peleg et al. ..................... | 707/100 |
| 2005/0102326 | A1 * | 5/2005 | Peleg et al. ..................... | 707/200 |
| 2006/0020605 | A1 * | 1/2006 | Chan et al. ...................... | 707/100 |
| 2006/0122964 | A1 * | 6/2006 | Yu et al. .......................... | 707/2 |

FOREIGN PATENT DOCUMENTS

JP 2006035774 2/2006

OTHER PUBLICATIONS

Bello et al., "Materialized View in Oracle", Proceedings of the 24th VLDB conference, New York, USA, Aug. 24-27, 1998, p. 659-664.*
Melnyk, Roman, "DB2 Basics: An Introduction to Materialized Query Tables," Sep. 2005.
Betawadkar-Norwood et al., "Maximize the Performance of WebSphere Information Integrator With Materialized Query Tables," May 23, 2006.

* cited by examiner

*Primary Examiner* — Vei-Chung Liang
(74) *Attorney, Agent, or Firm* — Lieberman & Brandsdorfer, LLC

(57) ABSTRACT

An apparatus is provided with base table storage sections that store base tables and delta tables for the base tables, a summary table storage section that stores a summary table for storing results of queries to a plurality of base tables and delta information about the summary table, delta data processing sections that insert delta data of the base tables into the delta tables, and a delta computation processing section that generates delta information about the summary table. The delta computation processing section is provided with a generation section that generates delta information about a specified base table on the basis of an update that has been performed for the base table, in a situation where a subsequent update of the specified base table is permitted; and a control section that performs control so that, when a different base table is specified, delta information is generated in a different transaction.

14 Claims, 21 Drawing Sheets

| C1 | C2 | C3 |
|---|---|---|
| 1 | Japan | Tokyo |
| 2 | US | New York |
| 3 | Japan | Osaka |

FIG. 2A

| C1 | C3 | Operationtype | Processflag |
|---|---|---|---|
|  |  |  |  |
|  |  |  |  |
|  |  |  |  |

FIG. 2B

| C1 | C2 | C3 |
|---|---|---|
| 1 | Japan | Tokyo |
| 2 | US | New York |
| 3 | Italy | Rome |

FIG. 2C

| C1 | C3 | Operationtype | Processflag |
|---|---|---|---|
| 3 | Osaka | -1 | 0 |
| 3 | Rome | 1 | 0 |
|  |  |  |  |

FIG. 2D

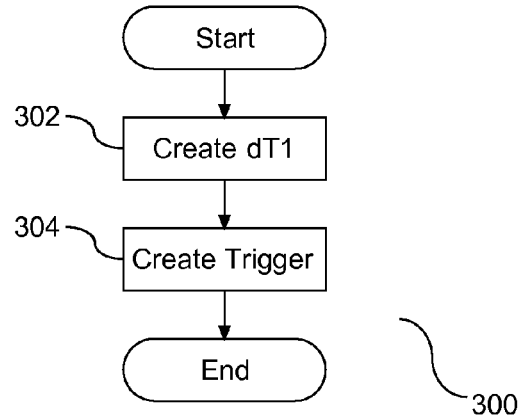

FIG. 3A

- T1 TABLE (COLUMNS: C AND I)
  create table T1 (c char(1), i integer);
- dT1 TABLE (COLUMNS: OPERATIONTYPE AND PROCESSFLAG ARE ADDED IN ADDITION TO C AND I)
  create table dT1 (c char(1), i integer, OPERATIONTYPE integer, PROCESSFLAG integer);
- CREATION OF TRIGGER (TRIGGER IN THE CASE WHERE RECORDS ARE ADDED TO T1 TABLE)
  create trigger t1_insert
  after insert on T1 referencing new as t
  for each row
  insert into dT1 values (t.c, t.i, -1, 0);
- CREATION OF TRIGGER (TRIGGER IN THE CASE WHERE RECORDS ARE DELETED FROM T1 TABLE)
  create trigger t1_delete
  after delete on T1 referencing old as t
  for each row
  insert into dT1 values (t.c, t.i, -1, 0);
- CREATION OF TRIGGER (TRIGGER IN THE CASE WHERE RECORDS IN T1 TABLE ARE UPDATED)
  create trigger t1_update
  after update on T1 referencing new as t1 old as t2
  for each row
  begin atomic
  insert into dT1 values (t2.c, t2.i, -1, 0);
  insert into dT1 values (t1.c, t1.i, 1, 0);
  end%

FIG. 3B

```
MQT=
SELECT T1.C1, T2.C2, T3.C3,
SUM(T1.C4) AS S1,
SUM(T2.C5) AS S2,
SUM(T3.C6) AS S3,
COUNT_BIG(*) AS C
FROM T1 AS T1, T2 AS T2, T3 AS T3
WHERE T1.C7=T2.C7 AND T1.C7=T3.C7
GROUP BY T1.C1, T2.C2, T3.C3
```

FIG. 12A

```
SELECT T1.C1, T2.C2, T3.C3,
SUM(CASE WHEN T1.OPERATIONTYPE=1 THEN T1.C4 ELSE -1*T1.C4 END) AS S1,
SUM(CASE WHEN T1.OPERATIONTYPE=1 THEN T2.C5 ELSE -1*T2.C5 END) AS S2,
SUM(CASE WHEN T1.OPERATIONTYPE=1 THEN T3.C6 ELSE -1*T3.C6 END) AS S3,
SUM(CASE WHEN T1.OPERATIONTYPE=1 THEN DECIMAL(1,31,0) ELSE DECIMAL(-1,31,0) END) AS C
FROM dT1 AS T1, T2 AS T2, T3 AS T3
WHERE T1.C7=T2.C7 AND T1.C7=T3.C7 AND T1.PROCESSFLAG=1
GROUP BY T1.C1, T2.C2, T3.C3
```

FIG. 12B

```
SELECT T1.C1, T2.C2, T3.C3,
SUM(CASE WHEN T1.OPERATIONTYPE*T2.OPERATIONTYPE=1 THEN -1*T1.C4 ELSE
T1.C4 END) AS S1,
SUM(CASE WHEN T1.OPERATIONTYPE*T2.OPERATIONTYPE=1 THEN -1*T2.C5 ELSE
T2.C5 END) AS S2,
SUM(CASE WHEN T1.OPERATIONTYPE*T2.OPERATIONTYPE=1 THEN -1*T3.C6 ELSE
T3.C6 END) AS S3,
SUM(CASE WHEN T1.OPERATIONTYPE*T2.OPERATIONTYPE=1 THEN DECIMAL(-1,31,0)
ELSE DECIMAL(1,31,0) END) ASC
FROM dT1 AS T1, dT2 AS T2, T3 AS T3
WHERE T1.C7=T2.C7 AND T1.C7=T3.C7 AND T1.PROCESSFLAG=1
GROUP BY T1.C1, T2.C2, T3.C3
```

FIG. 12C

```
SELECT T1.C1, T2.C2, T3.C3,
SUM(CASE WHEN T1.OPERATIONTYPE*T2.OPERATIONTYPE*T3.OPERATIONTYPE=1
THEN T1.C4 ELSE -1*T1.C4 END) AS S1,
SUM(CASE WHEN T1.OPERATIONTYPE*T2.OPERATIONTYPE*T3.OPERATIONTYPE=1
THEN T2.C5 ELSE -1*T2.C5 END) AS S2,
SUM(CASE WHEN T1.OPERATIONTYPE*T2.OPERATIONTYPE*T3.OPERATIONTYPE=1
THEN T3.C6 ELSE -1*T3.C6 END) AS S3,
SUM(CASE WHEN T1.OPERATIONTYPE*T2.OPERATIONTYPE*T3.OPERATIONTYPE=1
THEN DECIMAL(1,31,0) ELSE DECIMAL(-1,31,0) END) ASC
FROM dT1 AS T1, dT2 AS T2, dT3 AS T3
WHERE T1.C7=T2.C7 AND T1.C7=T3.C7 AND T1.PROCESSFLAG=1
GROUP BY T1.C1, T2.C2, T3.C3
```

FIG. 12D

```
MQT=
SELECT T1.C1, T2.C2, T3.C3,
SUM(T1.C4) AS S1,
SUM(T2.C5) AS S2,
SUM(T3.C6) AS S3,
COUNT_BIG(*) AS C
FROM T1 AS T1, T2 AS T2, T3 AS T3
WHERE T1.C7=T2.C7 AND T1.C7=T3.C7
GROUP BY T1.C1, T2.C2, T3.C3
```

FIG. 13A

```
SELECT T1.C1, T2.C2, T1.C7, T1.OPERATIONTYPE
SUM(CASE WHEN T1.OPERATIONTYPE=1 THEN T1.C4 ELSE -1*T1.C4 END) AS S1,
SUM(CASE WHEN T1.OPERATIONTYPE=1 THEN T2.C5 ELSE -1*T2.C5 END) AS S2,
SUM(CASE WHEN T1.OPERATIONTYPE=1 THEN DECIMAL(1,31,0) ELSE
DECIMAL(-1,31,0) END) AS C
FROM dT1 AS T1, T2 AS T2,
WHERE T1.C7=T2.C7 AND T1.PROCESSFLAG=1
GROUP BY T1.C1, T2.C2, T1.C7, T1.OPERATIONTYPE
```

FIG. 13B

```
SELECT T.C1, T.C2, T3.C3,
SUM(T.C4) AS S1,
SUM(T.C5) AS S2,
SUM(CASE WHEN T.OPERATIONTYPE=1 THEN T3.C6 ELSE -1*T3.C6 END) AS S3,
SUM(T.C) AS C
FROM dT1M1 AS T, T3 AS T3
WHERE T.C7=T3.C7
GROUP BY T.C1, T.C2, T3.C3
```

FIG. 13C

```
MQT=
SELECT T1.C1, T2.C2, T3.C3
FROM T1 AS T1, T2 AS T2, T3 AS T3
WHERE T1.C4=T2.C4 AND T1.C4=T3.C4
```

FIG. 14A

```
SELECT T1.C1, T2.C2, T3.C3, T1.OPERATIONTYPE
FROM dT1 AS T1, T2 AS T2, T3 AS T3
WHERE T1.C4=T2.C4 AND T1.C4=T3.C4 AND T1.PROCESSFLAG=1
```

FIG. 14B

```
SELECT T1.C1, T2.C2, T3.C3, (-1*T1.OPERATIONTYPE*T2.OPERATIONTYPE)
FROM dT1 AS T1, dT2 AS T2, T3 AS T3
WHERE T1.C4=T2.C4 AND T1.C4=T3.C4 AND T1.PROCESSFLAG=1
```

FIG. 14C

```
SELECT T1.C1, T2.C2, T3.C3, (T1.OPERATIONTYPE*T2.OPERATIONTYPE
*T3.OPERATIONTYPE)
FROM dT1 AS T1, dT2 AS T2, dT3 AS T3
WHERE T1.C4=T2.C4 AND T1.C4=T3.C4 AND T1.PROCESSFLAG=1
```

FIG. 14D

```
MQT=
SELECT T1.C1, T2.C2, T3.C3
FROM T1 AS T1, T2 AS T2, T3 AS T3
WHERE T1.C4=T2.C4 AND T1.C4=T3.C4
```

FIG. 15A

```
SELECT T1.C1, T2.C2, T1.OPERATIONTYPE, T1.C4
FROM dT1 AS T1, T2 AS T2
WHERE T1.C4=T2.C4 AND T1.PROCESSFLAG=1
```

FIG. 15B

```
SELECT T.C1, T.C2, T3.C3, T.OPERATIONTYPE
FROM dT1M1 AS T, T3 AS T3
WHERE T.C4=T3.C4
```

FIG. 15C

| Database Name | Table Name |
|---|---|
| TPCH1 | Region, Nation, Customer |
| TPCH2 | Part, Supplier, Partsupp |
| TPCH3 | Lineitem, Orders |

FIG. 16A

| | | Addition of Data(s) | Deletion of Data(s) |
|---|---|---|---|
| Each Delta at Once | Computation of dMQT | 6.3 | 5.0 |
| | Lock of Orders | 4.0 | 3.0 |
| | Lock of Lineitem | 2.2 | 1.9 |
| One by One | Computation of dMQT | 7.8 | 2.1 |
| | Lock of Orders | 0.16 | 0.03 |
| | Lock of Lineitem | 0.08 | 0 |

FIG. 16B

```
SELECT
  T2."O_SHIPPRIORITY" AS "O_SHIPPRIORITY",
  T2."O_ORDERSTATUS"AS "O_ORDERSTATUS",
  T4."R_NAME" AS "R_NAME",
  T5."N_NAME" AS "N_NAME",
  T3."P_MFGR" AS "P_MFGR",
  YEAR(T2."O_ORDERDATE") AS "year"
  MONTH(T2."O_ORDERDATE") AS "month",
  SUM(T1."L_DISCOUNT") AS "L_DISCOUNT",
  SUM(T1."L_EXTENDEDPRICE) AS "L_EXPENDEDPRICE",
  SUM(T1."L_QUANTITY") AS "L_QUANTITY",
  SUM(T1."L_TAX") AS "L_TAX",
  COUNT_BIG(*) AS "COUNT_*"

FROM
  "LINEITEM" AS T1,
  "ORDER" AS T2,
  "PART" AS T3,
  "REGION" AS T4,
  "NATION" AS T5,
  "CUSTOMER" AS T6
```

```
WHERE
  T1."L_ORDERKEY"=T2."O_ORDERKEY" AND
  T1."L_PARTKEY"=T3."P_PARTKEY" AND
  T6."C_CUSTKEY"=T2."O_CUSTKEY" AND
  T5."N_NATIONKEY"=T6.""C_NATIONKEY" AND
  T4."R_REGIONKEY"=T5."N_REIONKEY"

GROUPBY
  T2."O_SHIPPRIORITY",
  T2."O_ORDERSTATUS",
  T4."R_NAME",
  T5."N_NAME",
  T3."P_MFGR",
  YEAR(T2."O_ORDERDATE"),
  MONTH(T2."O_ORDERDATE")
```

FIG. 16C

| Database Name | Table Name |
|---|---|
| TPCH1 | Region, Nation, Customer |
| TPCH2 | Part, Supplier, Partsupp |
| TPCH3 | Lineitem, Orders |

FIG. 17A

| | | Addition of Data(s) | Deletion of Data(s) |
|---|---|---|---|
| Each Delta at Once | Computation of dMQT | 0.55 | 0.20 |
| | Lock of Orders | 0.34 | 0.16 |
| | Lock of Lineitem | 0.17 | 0 |
| One by One | Computation of dMQT | 1.83 | 0.86 |
| | Lock of Orders | 0.02 | 0.02 |
| | Lock of Lineitem | 0.02 | 0 |

FIG. 17B

```
SELECT
  T1.O_ORDERSTATUS,
  T1.O_ORDERDATE,
  T2.C_NAME,
  T3.S_NAME,
  T4.L_PARTKEY,
  T4.L_QUANTITY

FROM
  ORDERS AS T1,
  CUSTOMER AS T2,
  SUPPLIER AS T3,
  LINEITEM AS T4

WHERE
  T1.O_CUSTKEY=T2.C_CUSTKEY AND
  T1.O_ORDERKEY=T4.L_ORDERKEY AND
  T3.S_SUPPKEY=T4.L_SUPPKEY AND
  T1.O_ORDERPRIORITY="1-URGENT" AND
  T1.O_ORDERSTATUS="F"
```

FIG. 17C

APPARATUS, METHOD AND PROGRAM FOR REFRESHING A SUMMARY TABLE

BACKGROUND OF THE INVENTION

1. Technical Field

The present invention relates to an apparatus, method and program for refreshing a summary table that stores results of queries to a plurality of base tables. More specifically, the invention relates to an apparatus, method and program for refreshing the summary table on the basis of delta data of the base tables.

2. Description of the Prior Art

Recently, there has been an increase in activities for analyzing information held by companies or the like by using online analytical processing (OLAP) system. In this OLAP system, information to be analyzed is created by searching or aggregating tables (base tables) in a database (hereinafter referred to as a "database") with the use of an SQL statement. However, the processing requires a lot of time. Therefore, it is common to store a result of execution of an SQL statement in a table in advance to use it. The table for storing the result of execution of an SQL statement is generally called a "summary table." The summary table may also be called a "materialized query table" or a "materialized view" according to database vendors. In this specification, "MQT," an abbreviation of the materialized query table, will be mainly used.

If information in a base table being referred to is updated after an MQT is created by performing computation in advance, inconsistency between the MQT and the base table occurs. Therefore, it is necessary to perform processing for resynchronization to correct the inconsistency. This processing is generally called "refresh." The refresh of the MQT can be classified into a full refresh and an incremental refresh. The full refresh is a method in which MQT is re-created by executing a SELECT statement associated with MQT. The incremental refresh is a method in which MQT is computed with the use of delta data corresponding to updated contents in base tables being referred to.

The refresh of the MQT can be also classified into refresh to be immediately performed (refresh immediate) and refresh to be deferred performed (refresh deferred) from the viewpoint of the timing of refresh, "Database2 Basics: An Introduction to Materialized Query Tables", Sep. 8, 2005, by Roman B. Melnyk, which is hereby incorporated by reference, and "Maximize the Performance of WebSphere Information Integrator With Materialized Query Table", May 23, 2006, by Anjali Betawadkar-Norwood et al., which is hereby incorporated by reference. The refresh immediate is a method in which, when data is inserted, updated or deleted in a table being referred to, data is automatically inserted, updated or deleted in MQT. The refresh deferred is a method in which data can be refreshed at any time by a refresh command, though data is not automatically inserted, updated or deleted in MQT even when data is inserted, updated or deleted in a table being referred to. In the case of performing the incremental refresh by the deferred refresh, when information in a base table is updated, the delta of MQT is inserted into a staging table.

Then, when a refresh command is issued, MQT is refreshed with the use of the staging table. In this case, the incremental refresh of MQT is conventionally performed with the use of the transaction for updating information in the base table being referred to.

As described above, in conventional techniques, since the computation processing for incremental refresh of MQT is performed by one transaction. It is therefore necessary to lock all the base tables referred to by MQT while the processing is performed. If the time for locking the base tables can be shortened, the time during which the data in the base tables cannot be updated is reduced, and the influence on business activities can be reduced.

It has been common that information held by a company or the like is managed in a distributed manner. For example, a system form is common in which information is managed for each department. Such a system form often adopts a database environment consisting of not one database but a plurality of databases, that is, a distributed database environment in which the plurality of databases are integrated and tables existing in the respective databases can be handled as if they were in the same one database. Here, the "database environment" means a system for accessing a database with an SQL statement and acquiring a result of the access.

Recently, even in a distributed database environment, it is required to effectively and efficiently utilize information to improve the competitiveness of companies, by integrating distributed information. Therefore, even in such an environment, analysis of information by OLAP is performed, and MQT may be created. However, at present, only a full refresh can be performed in a distributed database environment. That is, the function of an incremental refresh of MQT is not provided. Furthermore, if an incremental refresh is attempted with the use of a conventional method in a distributed database environment, it is necessary to lock all of the base tables. Since the incremental refresh must be performed with the use of the distributed base tables, the computation processing requires a lot of time. Furthermore, since the entire base tables are locked during the computation processing, it is not possible to register, update, or delete data occurring in business activities, which influences the business activities.

The present invention has been made to solve the above technical problems, and its object is to shorten the time for locking base tables to perform incremental refresh of a summary table.

SUMMARY OF THE INVENTION

This invention comprises an apparatus, method, and article to refresh a summary table.

In one aspect of the invention, an apparatus is provided with a summary table that stores results of queries to a plurality of base tables is refreshed with the use of a plurality of transactions in the present invention. That is, the apparatus of the present invention is provided with a generator configured to generate delta information for reflecting in the summary table changes made before a predetermined time point in a specified base table among the multiple base tables, in a situation where the specified base table is permitted to be changed after the predetermined time point. In addition, a controller is provided and configured to control the generator so as to generate the delta information by a different transaction when a different base table is specified.

In another aspect of the invention, a method is provided for refreshing a summary table that stores results of queries to a plurality of base tables, with the use of multiple transactions. In this case, the method includes identifying changes made before a predetermined time point in a specified base table among the plurality of base tables. Following the identification process, at least one base table among a plurality of base tables, except the specified base table, is prevented from being changed. Delta information is generated for reflecting the changes identified in the identification step in the summary table by referring to the base tables prevented from being changed in a situation where the specified base table is permitted to be changed after the predetermined time point. Following the step of generating the delta information, changes are permitted to the base tables previously prohibited from accepting changes.

In yet another aspect of the invention, a method is provided for refreshing a summary table that stores results of queries to a plurality of base tables. Changes made before a predetermined time point in a first base table of a plurality of base tables are identified. A second base table among the plurality of base tables is then prevented from being changed, followed by generating delta information for reflecting the changes identified in the identification step in the summary table by referring to the second base table in a situation where the first base table is permitted to be changed after the predetermined time point. Changes to the second base table are permitted. In addition, a third base table among the plurality of base tables is prevented from being changed. The delta information is updated by referencing the third base table. Thereafter, changes to the third base table are permitted.

In an even further aspect in the invention, a computer program product is provided with a computer useable medium, including a computer readable program, to execute on a computer. The computer program causes the computer to refresh a summary table that stores results of queries to a plurality of base tables, and also causes the computer to generate delta information to reflect in a summary table changes made in a specified base table from among the multiple base tables before a predetermined time point in a condition that it is possible to change the specified base table after the predetermined time point. In addition, instructions are provided to control the delta information to be generated by a different transaction when a different base table is specified.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 2a-2d are diagrams showing an example of a base table and a delta table used in the embodiment of the present invention;

FIGS. 3a and 3b are diagrams showing delta data processing in the embodiment of the present invention;

FIGS. 12a and 12b are diagrams showing an example of SQL statements to be used to compute the delta of MQT in the embodiment of the present invention;

FIGS. 12c and 12d are diagrams showing the example of SQL statements to be used to compute the delta of MQT in the embodiment of the present invention;

FIGS. 13a and 13b are diagrams showing an example of SQL statements to be used to compute the delta of MQT in the embodiment of the present invention;

FIG. 13c is a diagram showing the example of an SQL statement to be used to compute the delta of MQT in the embodiment of the present invention;

FIGS. 14a, 14b, 14c, and 14d are diagrams showing an example of SQL statements to be used to compute the delta of MQT in the embodiment of the present invention;

FIGS. 15a, 15b, and 15c are diagrams showing an example of SQL statements to be used to compute the delta of MQT in the embodiment of the present invention;

FIGS. 16a and 16b are diagrams showing the result of an experiment on the embodiment of the present invention;

FIG. 16c is a diagram showing the result of the experiment on the embodiment of the present invention;

FIGS. 17a and 17b are diagrams showing the result of an experiment on the embodiment of the present invention;

FIG. 17c is a diagram showing the result of the experiment on the embodiment of the present invention.

DESCRIPTION OF THE PREFERRED EMBODIMENT

Technical Details

Figure 1:
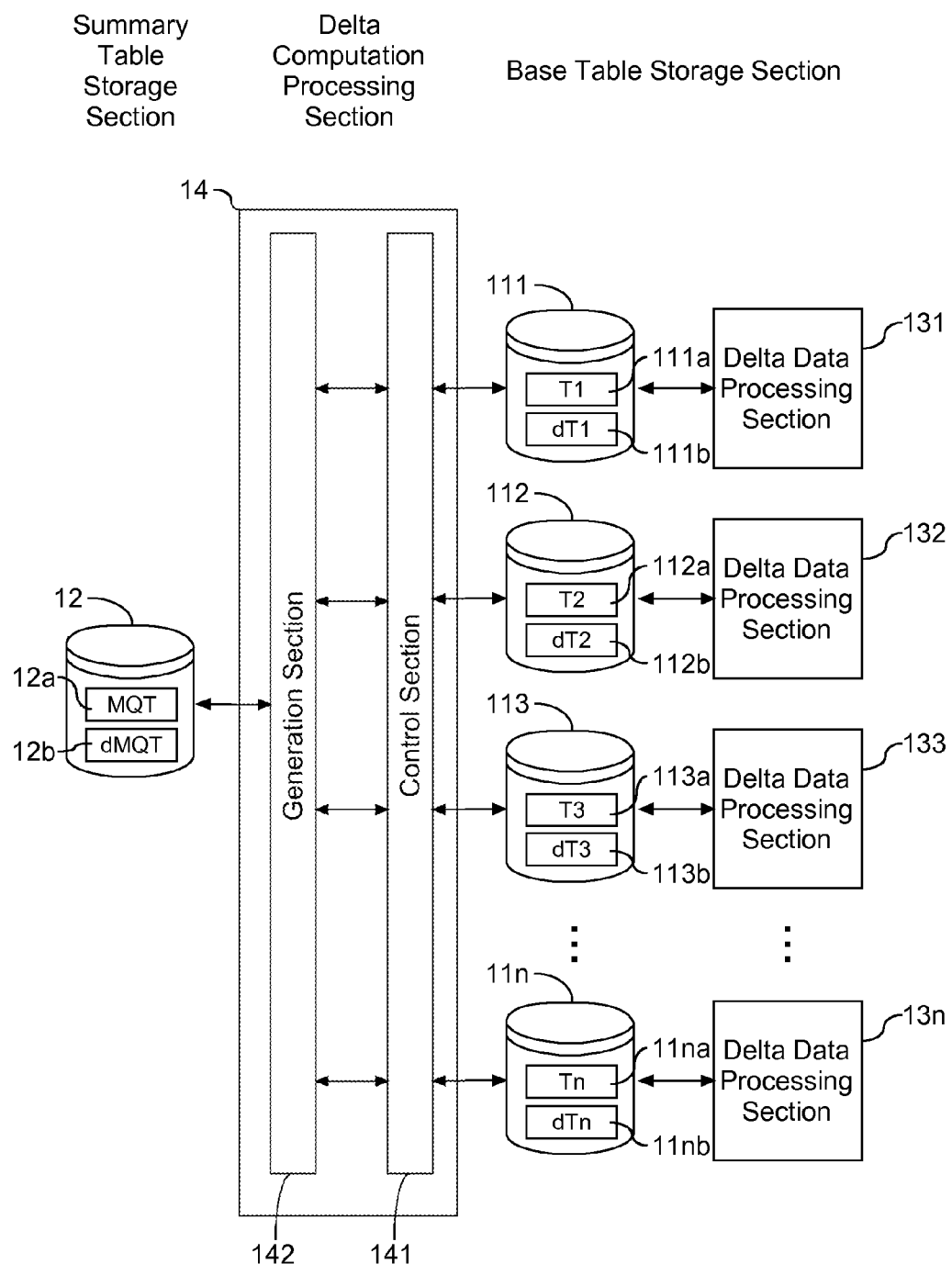
FIG. 1 is a diagram showing the configuration of a computer system in an embodiment of the present invention, according to the preferred embodiment of this invention, and is suggested for printing on the first page of the issued patent.

The best mode for practicing the present invention (hereinafter referred to as an "embodiment") will be described in detail below with reference to accompanying drawings. First, the principle of this embodiment will be described. When MQT holds a result of execution of a SELECT statement that refers to three tables T1, T2 and T3, the relation among these tables is assumed to be indicated by the following formula in this specification.

$$MQT = T1 \bowtie T2 \bowtie T3 \qquad \text{(Formula 1)}$$

When MQT holds a result of execution of a SELECT statement that refers to n tables T1 to Tn, the relation among these tables is assumed to be indicated by the following formula in this specification.

$$MQT = \bowtie_{i=1}^{n} Ti = T1 \bowtie T2 \bowtie \ldots \bowtie Tn-1 \bowtie Tn \qquad \text{(Formula 2)}$$

Here, delta tables for holding delta data of T1 to Tn, respectively, are provided, and these delta tables are denoted by dT1, dT2, . . . , respectively. Furthermore, the old MQT, the latest MQT and the delta between them are denoted by $MQT_{old}$, MQT and dMQT, respectively, the following formula is satisfied.

$$dMQT = MQT - MQTold \quad \text{(Formula 3)}$$

$$= \underset{i=1}{\overset{n}{\bowtie}} Ti - \underset{i=1}{\overset{n}{\bowtie}} (Ti - dTi)$$

$$= \sum_{i=1}^{n} \left( \underset{j=1}{\overset{i-1}{\bowtie}} Tj \bowtie dTi \bowtie \underset{j=i+1}{\overset{n}{\bowtie}} (Tj - dTj) \right)$$

From this formula, it is known that Ti and dTi (i=1 to n) must be consistently the same during this computation processing, and that any of the tables T1 to Tn cannot be updated. Therefore, in this embodiment, the processing for computing dMQT is divided and performed in a plurality of transactions. The delta MQT (dMQT) about the delta data dT1 of T1 is indicated by the following formula.

$$dMQT \text{ for } dT1 = T1 \bowtie (T2 - dT2) \bowtie \ldots \quad \text{(Formula 4)}$$

$$\bowtie (Tn - dTn) - (T1 - dT1) \bowtie (T2 -$$

$$dT2) \bowtie \ldots \bowtie (Tn - dTn)$$

$$= T1 \bowtie \underset{i=2}{\overset{n}{\bowtie}} (Ti - dTi) -$$

$$(T1 - dT1) \bowtie \underset{i=2}{\overset{n}{\bowtie}} (Ti - dTi)$$

$$= dT1 \bowtie \underset{i=2}{\overset{n}{\bowtie}} (Ti - dTi)$$

In this formula, T1 is not used though dT1 is used. Therefore, it is possible to update T1 during this computation. However, dT1, Ti and dTi (i=2 to n) must be consistently the same during this computation. Since the delta of MQT about dT1 is reflected by the processing based on this formula, the used dT1 is deleted after this processing ends. Similar processing is also performed for T2 to Tn. In this case also, it is possible to update Ti during computation of dMQT about dTi (i=2 to n). Each of the processing for computing the delta of MQT about dT1 to dTn is performed in one transaction, respectively. That is, the processing is performed in n transactions in total. Therefore, in the case of computing dMQT about dT1, dT2 and dT3 sequentially, it is possible to update T1 in the first transaction, T2 in the second transaction and T3 in the third transaction.

Implementation of this principle by a computer system will be described below. First, a description will be made on a computer system to which this embodiment is applied. FIG. 1 shows a configuration example of the computer system according to this embodiment. As shown in the diagram, this computer system is provided with base table storage sections (111) to (11n), a summary table storage section (12), delta data processing sections (131) to (13n) and a delta computation processing section (14).

Each of the base table storage sections (111) to (11n) stores a base table and a delta table holding the delta data of the base table. Base table storage section (111) stores a base table (111a) and a delta table (111b). Similarly, base tale storage section (112) stores a base table (112a) and a delta table (112b). It is assumed that, in accordance with the example used in the description of the principle, the base table storage sections (111) to (11n) store T1 and dT1, T2 and dT2, T3 and dT3, . . . , Tn and dTn, respectively. Though T1 and dT1, T2 and dT2, T3 and dT3, . . . , Tn and dTn are shown as being stored in the different storage media, respectively here, the configuration is not limited. It is also possible to select some pairs from these and store them in one storage medium.

The summary table storage section (12) stores a summary table (12a) and delta information for refreshing the summary table (12b). The summary table storage section (12) is assumed to store MQT (12a) and dMQT (12b) in accordance with the example used in the description of the principle. The delta data processing sections (131) to (13n) process the delta data of base tables stored in the base table storage sections (111) to (11n), respectively. That is, if any base table is updated, delta data indicating the updated contents is stored in a corresponding delta table. The processing for storing the delta data in the delta table can be performed with the use of a trigger function provided by an existing DBMS (DataBase Management System) or a function of capturing a transaction log in which change made in a database is stored, as described later. The transaction log may be called a "recovery log" or a "database log" according to manufacturers. In this specification, "transaction log" will be used.

The delta computation processing section (14) computes delta to refresh the summary table on the basis of the delta data of the base tables stored in the base table storage sections (111) to (11n). The delta computation processing section (14) is provided with a control section (141) and a generation section (142). The control section (141) controls the entire delta computation processing section (14). That is, the control section (141) specifies one of T1, T2, T3, . . . , Tn stored in the base table storage sections (111) to (11n), respectively, to permit the specified table to be updated, and instructs the generation section (142) to generate dMQT about the delta data of the table. In this case, the control section (141) controls the generation section (142) to perform processing in a different transaction if a different table is specified. The control section (141) also locks T1, T2, T3, . . . , Tn, updates dT1, dT2, dT3, . . . , dTn and commits a transaction. The generation section (142) generates dMQT about the delta data of the table specified by the control section (141) and stores it in the summary table storage section (12).

Now, dTi in which the delta data of Ti is held will be specifically described. In addition to the column name of Ti to be used for computation of the delta of MQT, dTi has the columns, One of the columns is for a flag indicating whether data has been added or deleted. In this embodiment, this column is called "an operation type". In one embodiment, the column stores "1" in the case of addition and "−1" in the case of deletion. In the diagram, this is shown as "OPERATION-TYPE". Another column is for a flag indicating whether the data is being computed or it is unprocessed. In this embodiment, this column is called "a process flag". In one embodiment, the column stores "1" if the data is being computed, and stores "0" if the data is unprocessed. In the diagram, this is shown as "PROCESSFLAG".

For example, data is stored in dTi as follows. When data is inserted into Ti, data (a record) obtained by adding "1" and "0" as an operation type and a process flag, respectively, is inserted into dTi among columns used for MQT. When data is deleted from Ti, data (a record) obtained by adding "−1" and "0" as an operation type and a process flag, respectively, is inserted into dTi among columns used for MQT. Furthermore, if data in Ti is updated, processing is performed on the assumption that old data has been deleted and new data has been inserted.

Now, update of Ti and insertion of delta data into dTi will be specifically described. FIG. 2 shows an example of insertion of delta data into dT1 performed in response to update of T1. In this example, T1 is constituted by three columns C1, C2 and C3. If the columns C1 and C3 are used in MQT, then the columns of dT1 are C1, C3, OPERATIONTYPE and PROCESSFLAG. Now, it is assumed that T1 holds such data as shown in FIG. 2(a) and dT1 is empty as shown in FIG. 2(b) at a certain point of time. Now, the case will be considered where the record of C1=3, C2='JAPAN' and C3='OSAKA' in T1 is updated to C1=3, C2='ITALY' and C3='ROME', as shown in FIG. 2(c). In this case, dT1 holds data as shown in FIG. 2(d). That is, delta data is inserted which indicates that the record of C1=3, C2='JAPAN' and C3='OSAKA' has been deleted and the record of C1=3, C2='ITALY' and C3='ROME' has been added.

Next, the operation of each processing section of the computer system shown in FIG. 1 will be described. First, the operation of the delta data processing sections (131) to (13n) will be described. As described before, the delta data processing sections (131) to (13n) creates the delta tables dT1 to dTn, respectively, for the purpose of holding the delta data of T1 to Tn and insert the delta data of T1 to Tn into dT1 to dTn. In this case, the insertion of the delta data into the delta tables is performed with the use of the trigger function of the database or the function of capturing a transaction log.

First, description will be made on the case of inserting delta data into a delta table with the use of the trigger function. Here, description will be made on the delta data processing section (131) among the delta data processing sections (131) to (13n). FIG. 3 is a diagram illustrating creation of a delta table with the use of the trigger function. FIG. 3(a) is a flowchart (300) showing the flow of the processing. As shown in the diagram, in the case of using the trigger function, dT1 is created first (302), and then a trigger is created (304).

FIG. 3(b) shows SQL statements for creation of dT1 at step (302) and creation of a trigger at step (304). It is assumed that T1 has been created by the first SQL statement. Next, dT1 is created by the second SQL statement. In this case, it should be ensured to hold an operation type and a process flag in dT1 as described before. Then, a trigger is created by the third to fifth SQL statements. In this case, it is specified to insert a record with the operation type set to "1" in the case of addition, a record with the operation type set to "−1" in the case of deletion, and records with the operation type set to "1" and "−1", respectively, in the case of update. It is specified to set the process flag to "0" in any of the cases. By creating a trigger in advance, database automatically inserts delta data into a delta table afterward.

Figure 4:
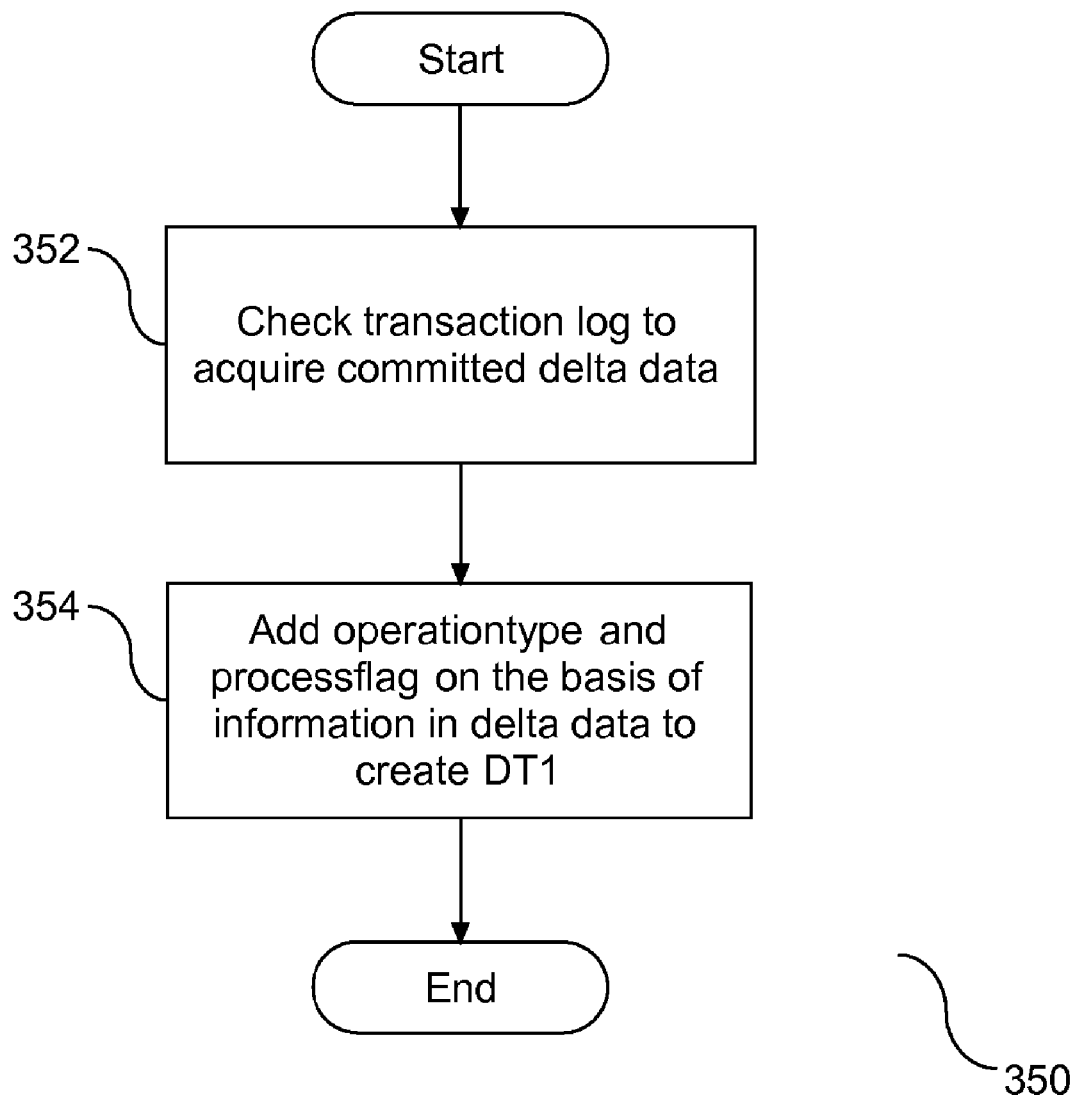
FIG. 4 is a flowchart showing the operation of a delta data processing section in the embodiment of the present invention.

Next, description will be made on the case of inserting delta data into a delta table with the use of the function of capturing a transaction log. In this case also, description will be made on the delta data processing sections (131) among the delta data processing sections (131) to (13n). FIG. 4 is a flowchart (350) showing the operation of the delta data processing sections 131 to be performed in this case. The delta data processing sections 131 periodically performs the following processing. First, the delta data processing sections (131) checks a transaction log to acquire committed delta data (step 352).

Next, the delta data processing sections 131 adds an operation type and a process flag to the delta data and inserts it into dT1 (step 354). A record with the operation type set to "1" is inserted in the case of addition; a record with the operation type set to "−1" is inserted in the case of deletion; and records with the operation type set to "1" and "−1", respectively, are inserted in the case of update. The process flag is set to "0" in any of the cases.

When the delta data is stored in dTi (i=1 to n) in this way, the delta computation processing section (14) performs computation processing of dMQT. In this embodiment, the control section (141) specifies Ti among T1 to Tn and instructs the generation section (142) to compute dMQT about dTi. In response to this, the generation section (142) generates dMQT in a transaction different from that used when a different table is specified.

As the method for the generation section (142) to generate dMQT, there are two methods as follows. One is a method in which the computation of dMQT about dTi is performed in one transaction while all of dTj (j=1 to n and j≠i) are locked. In this specification, this method is referred to as "Each delta at once". The other is a method in which the computations of dMQT about dTi is divided into computation using a combination of dTi and another table and computation using a combination of the result thereof and still another table, and each computation is performed in a different transaction to divide the original transaction into smaller pieces. In this specification, this method is referred to as "One by one".

Figure 5:
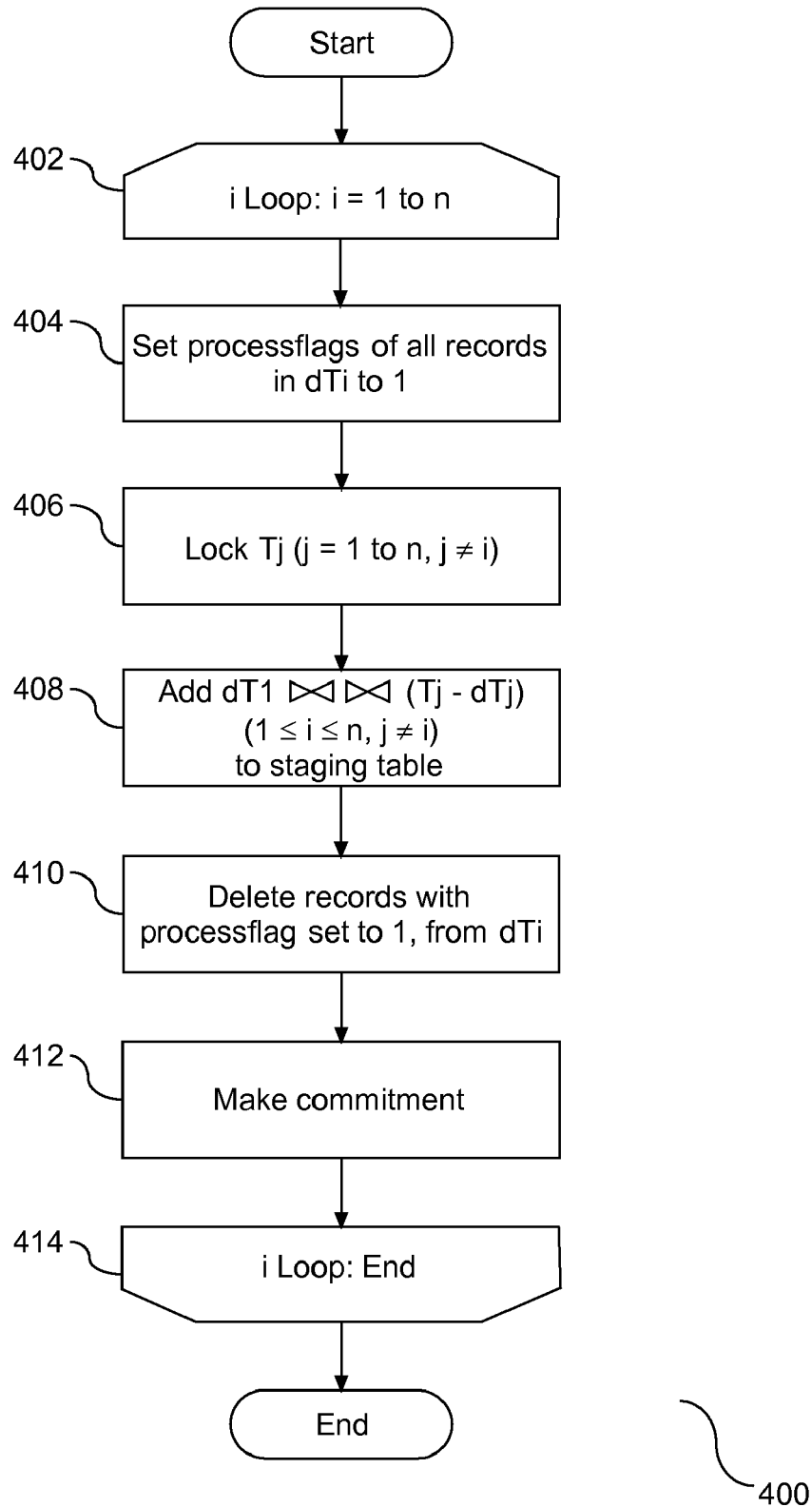
FIG. 5 is a flowchart showing a first operation of a delta computation processing section in the embodiment of the present invention.

Now, description will be made on the operation of this embodiment performed in the case of using each of the two methods. First, the operation performed in the case of "Each delta at once" will be described. FIG. 5 is a flowchart (400) showing the operation of the delta computation processing section (14) performed in this case. In the delta computation processing section (14), the control section (141) first specifies one base table among T1 to Tn and sets it as Ti. Then, the control section (141) starts I loop processing for this Ti (402). In this case, the control section (141) performs control so that one I loop processing is executed in one transaction.

Then, the delta of MQT about dTi is computed by the i loop. That is, the control section (141) first sets the process flags of all the data existing in dTi at the time point to "1" to indicate that computation processing are being performed (404). Furthermore, Tj (j=1 to n, j≠i) are locked in the latest condition at the time point of starting the processing (406).

Next, under the control of the control section (141), the generation section (142) computes dMQT about dTi and adds the computation result to a staging table (408). Only data with the process flag set to "1", among the data in dTi, is used for computation of dMQT here. In this case, there may be a case where Ti is updated during the computation of dMQT about dTi and delta data is inserted into dTi, because Ti is not locked although Tj (j=1 to n, j≠i) are locked. However, since the process flag of the delta data is set to "0", the delta data is not used for the current computation of dMQT and used for the next computation of dMQT.

When dMQT is added to the staging table in this way, the control section (141) deletes the data with the process flag set to "1", from the data in dTi (410). That is, the data used for the computation of dMQT is deleted. Last, the control section (141) makes commitment to determine the processing (412). Thereby, Tj (j=1 to n, j≠i) are released from the lock performed at step 406. Thus, the i loop processing ends (414). By performing such processing for dT1 to dTn, dMQT in which all of dT1 to dTn are reflected can be obtained. The dMQT stored in the staging table is reflected in MQT with the use of an existing technique.

Figure 6A:
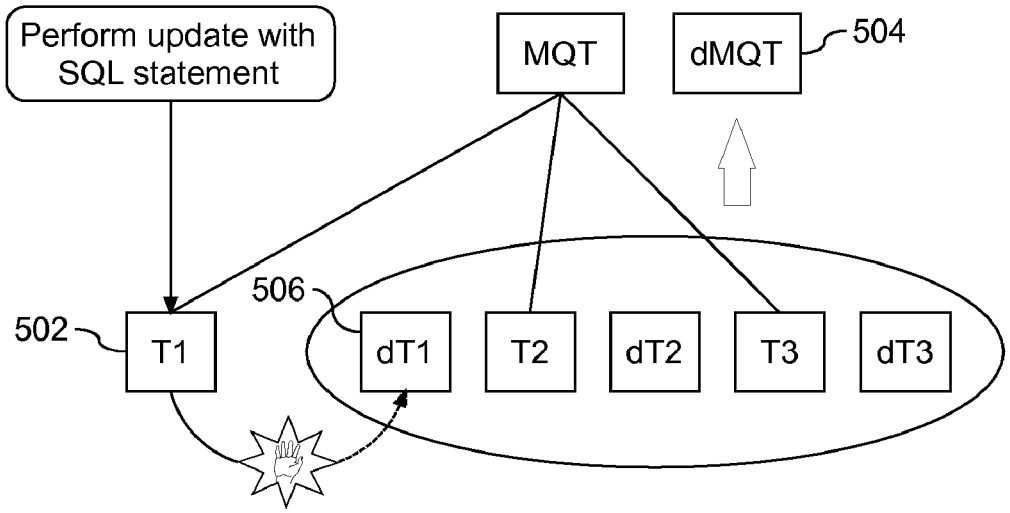
FIGS. 6a and 6b are diagrams showing the image of the first operation of the delta computation processing section in the embodiment of the present invention.

Now, the image of the above processing will be described. The case of generating dMQT from T1, T2 and T3 will be considered here. First, description will be made on the case of performing delta data processing with the use of the trigger function. As an example to be compared with the processing of this embodiment performed in this case, the case where a process flag is not used is shown in FIG. 6(a). In this example, if T1 (502) is updated while dMQT (504) about dT1 (506) is computed, the trigger function attempts to insert delta data into dT1 (506). However, this is blocked because dT1 (506) is being used for the computation of dMQT (504), and T1 (502) cannot be updated until the computation of dMQT (504) ends.

Figure 6B:
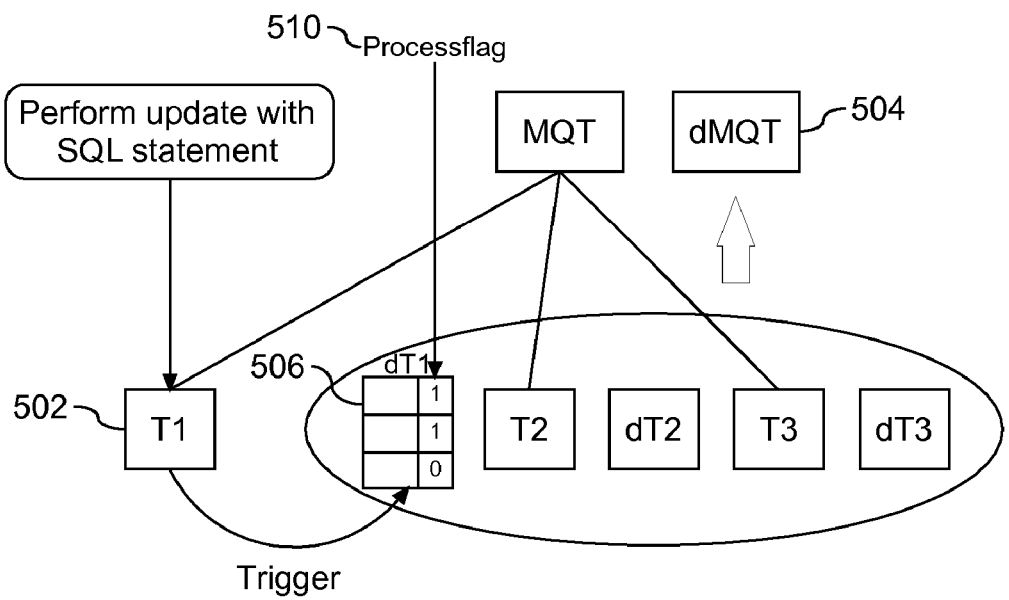

On the other hand, FIG. 6b shows the case of using a process flag (510). In this example, computation of dMQT (504) about dT1 (506) is performed with the use of such data in dT1 (506) that the process flag (510) is set to "1". Therefore, by setting the process flag (510) to "0", the delta data of T1 (502) can be inserted without being blocked even when computation processing of dMQT (504) is being performed. In this case, the management method using a process flag (510) is adopted as an example of a method for distinguishing update performed before a certain point of time from update performed after the point of time to perform management in the area for managing update of the tables.

Figure 7:
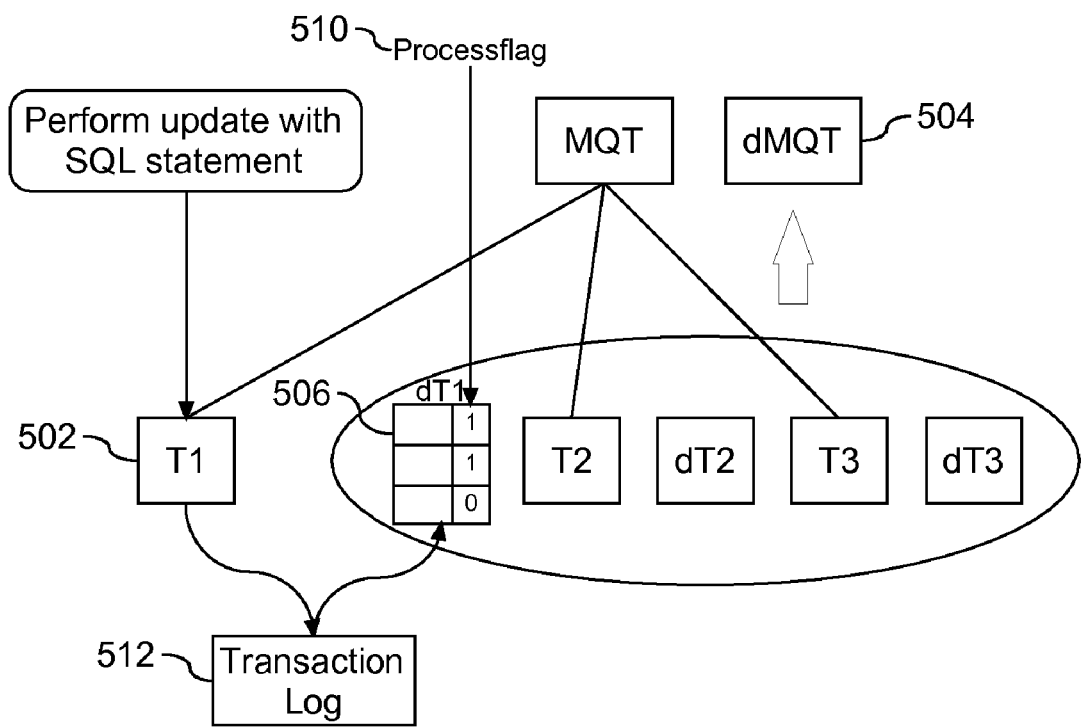
FIG. 7 is a diagram showing the image of the first operation of the delta computation processing section in the embodiment of the present invention.

Description will be made on the case of performing the delta data processing with the use of a transaction log. FIG. 7 shows the image of the processing of this embodiment performed in this case. In this example also, the computation of dMQT (504) about dT1 (506) is performed with the use of the data with the process flag set to "1" in dT1 (506). Therefore, by setting the process flag to "0", the delta data of T1 (502) can be inserted without being blocked even when computation processing of dMQT (504) is being performed. In this case also, the management method using a process flag is adopted as an example of a method for distinguishing update performed before a certain point of time from update performed after the point of time to perform management in the area for managing update of the tables. It is also possible to stop the function of capturing a transaction log (512) while computation processing of dMQT (504) is being performed. That is, by periodically checking the transaction log to stop the capture operation of inserting delta data into dT1 (506), it is possible to update T1 (502) even when computation processing of dMQT (504) is being performed. In this case, the processing for capturing a transaction log (512) is adopted as an example of processing for managing update after a certain point of time, in the area for managing update of the tables.

Figure 8:
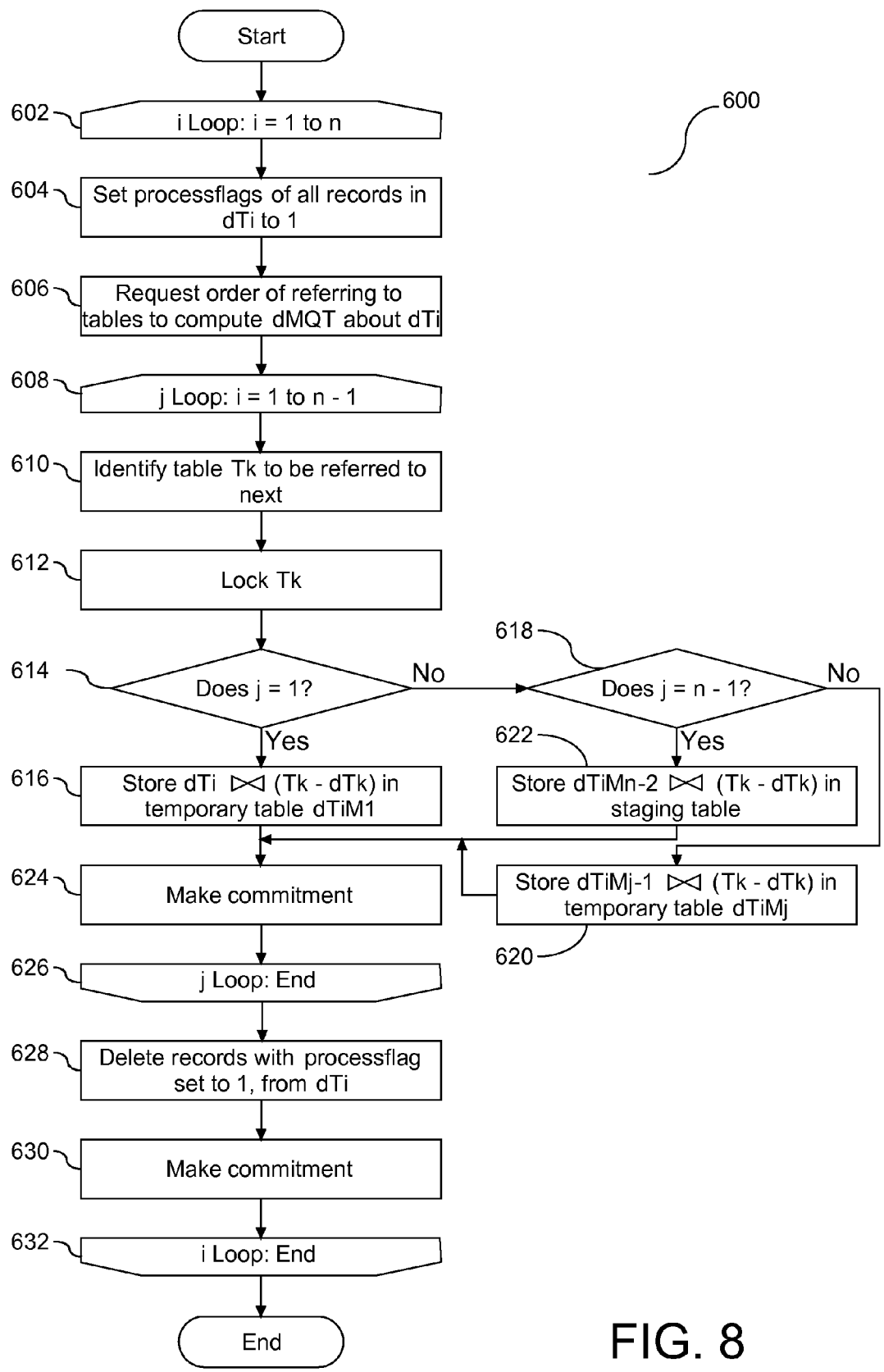
FIG. 8 is a flowchart showing a second operation of the delta computation processing section in the embodiment of the present invention.

Next, the operation in "One by one" will be described. FIG. 8 is a flowchart (600) showing the operation of the delta computation processing section (14) performed in this case. In the delta computation processing section (14), the control section (141) first specifies one base table among T1 to Tn and sets it as Ti. Then, I loop processing is started for this Ti (602).

In the I loop, the delta of MQT about dTi is computed. That is, the control section (141) first sets the process flags of all the data existing in dTi at the time point to "1" to indicate that computation processing are being performed (604). Furthermore, the control section (141) requests an order control section not shown to estimate the order of referring to Tj (j=1 to n,j≠i) in computing dMQT about dTi (606). This estimation of the reference order by the order control section can be performed by the compiler function of database. After that, the control section (141) starts j loop processing for each of the cases of j=1 to n−1 (608). The control section (141) performs control so that one j loop processing is executed in one transaction.

In the j loop, any of processing for computing a temporary table from dTi and one different table, processing for computing a different temporary table from the temporary table and one different table and processing for computing dMQT from the temporary table and one different table is performed. That is, the control section (141) first identifies a table Tk to be referred to next on the basis of the result of the estimation by the order control section (610), where k is an integer other than I among 1 to n. Tk is locked in the latest condition at the time point of starting the processing (612).

Next, the control section (141) determines whether j=1 is satisfied or not (612). That is, it is determined whether or not the current processing is the first processing in the j loop. If j=1 is satisfied, then the generation section (142) stores a temporary table dTiM1 based on dTi and (Tk-dTk) under the control of the control section (141) (step 616). Only data with the process flag set to "1", among the data in dTi, is used for computation of dMQT here. In this case, there may be a case where Ti is updated during the computation of dMQT about dTi and delta data is inserted into dTi, because Ti is not locked though Tk is locked. However, since the process flag of the delta data is set to "0", the delta data is not used for the current computation of dMQT and used for the next computation of dMQT. On the other hand, if it is determined at (612) that j=1 is not satisfied, then the control section (141) determines whether j=n−1 is satisfied (618). That is, it is determined whether or not the current processing is the last processing in the j loop.

If it is determined that j=n−1 is not satisfied, then the generation section (142) stores a temporary table dTiMj based on dTiMj−1 and (Tk-dTk) under the control of the control section (141) (step 620). Since the data in dTi is not used for this computation but the data of the temporary table is used therefore, it is possible to insert delta data into dTi. That is, Ti is updatable. On the other hand, if j=n−1 is satisfied at (618), then the generation section (142) generates dMQT from dTiMn−2 and (Tk-dTk) and adds it to the staging table under the control of the control section (141) (step 622). After that, the control section (141) commits a transaction that refers to Tk to determine the processing (624). Thereby, Tk is released from the lock performed at (612). Thus, the j loop processing ends (626).

When dMQT is added to the staging table in this way, the control section (141) deletes the data with the process flag set to "1", from the data in dTi (628). That is, the data used for the computation of dMQT is deleted. Last, the control section (141) makes commitment to determine the processing (630). Thus, the I loop processing ends (632). By performing such processing for dT1 to dTn, dMQT on which all of dT1 to dTn are reflected can be obtained. The dMQT stored in the staging table is reflected in MQT with the use of an existing technique.

Figure 9:
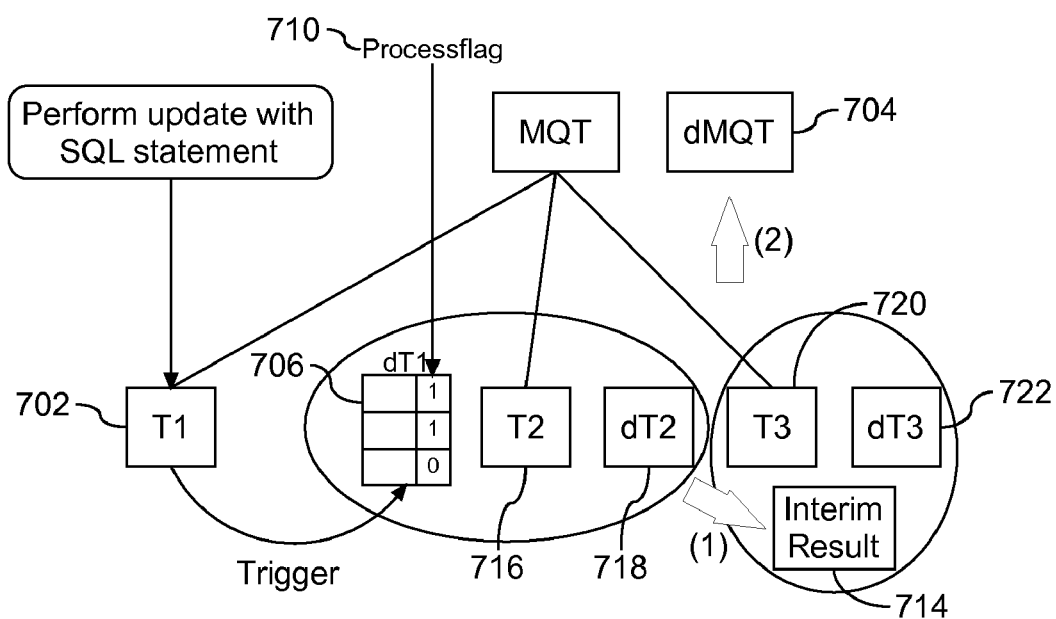
FIG. 9 is a diagram showing the image of the second operation of the delta computation processing section in the embodiment of the present invention.

Now, the image of the above processing will be described. The case of generating dMQT from T1, T2 and T3 will be considered here. In this "One by one" also, the case of using the trigger function to perform the delta data processing and the case of using a transaction log to perform the delta data processing are conceivable. Here, description will be made on the case of using the trigger function. FIG. 9 shows the image of the processing of this embodiment performed in this case. In this example, the computation of dMQT (704) about dT1 (706) is performed with the use of data with the process flag set to 1 in dT1 (706). Therefore, by setting the process flag to "0", the delta data of T1 can be inserted without being blocked even when computation processing of dMQT (704) is being performed. Then, an interim result (a temporary table) (714) is generated with the use of dT1 (706), T2 (716), and dT2 (718) first, as indicated by (1). After that, dMQT (704) is generated with the use of the interim result, T3 (720) and dT3 (722) as indicated by (2).

The operations in "Each delta at once" and "One by one" have been described. These operations make it possible to generate dMQT without locking Ti in the I loop. However, these processing have some points to be further improved. That is, the delta data of T1 generated during computation of dMQT about dT1 is carried over to the next processing. Meanwhile, since computation of dMQT about dT2 is performed after the computation of dMQT about dT1 ends, a phenomenon may occur that the delta data of T2 generated almost at the same time is not carried over to the next processing but reflected in dMQT by the current processing.

Figure 10:
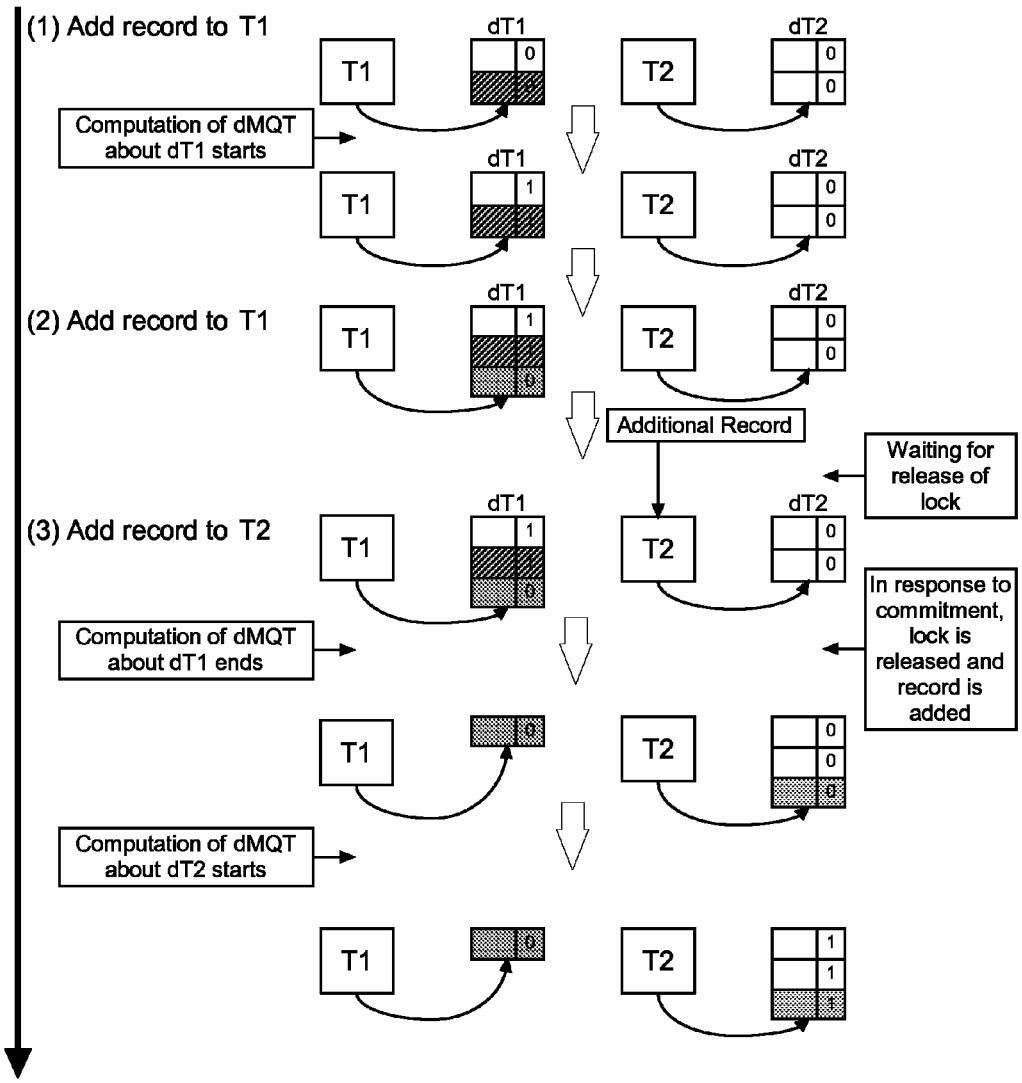
FIG. 10 is a diagram for illustrating a point to be further improved in the embodiment of the present invention.

FIG. 10 shows the mechanism of such a phenomenon occurring, along the time flow. An example of computing MQT from T1 and T2 is shown in the diagram. First, a record is added to T1 in (1). Then, delta data corresponding to the addition of the record is inserted into dT1. The process flag of the delta data is set to "0" then. In the diagram, this delta data is indicated by diagonal lines. In this condition, computation of dMQT about dT1 starts. In this case, the process flags of all the delta data in dT1 are set to "1". This delta data will be a target of the computation of dMQT. T2 is locked and cannot be updated.

After that, a new record is added to T1 in (2). Then, delta data corresponding to the addition of this record is inserted into dT1. The process flag of the delta data is set to "0" then. Since only delta data with the process flag set to "1" is the target of the computation of dMQT, this delta data is not a target of the computation. In the diagram, this delta data is indicated by light meshing. After that, a new record is added to T2 in (3). Since T2 is locked then, the record is in a condition of waiting for the lock to be released. In this condition, the computation of dMQT about dT1 ends as shown in the diagram. In this case, the data used for the computation of dMQT is deleted from dT1 as shown in the diagram. Furthermore, at this time point, T2 is released from the lock; update of T2 is enabled; and the record waiting for the lock to be released is added.

Then, delta data corresponding to the addition of this record is inserted into dT2. The process flag of the delta data is then set to "0". In the diagram, this delta data is indicated by dark meshing. In this condition, computation of dMQT about dT2 starts. In this case, the process flags of all the delta data in dT2 are set to "1". This delta data will be a target of the computation of dMQT.

That is, in this example, though addition of a record to T1 in (2) and addition of a record to T2 in (3) are performed at almost the same timing, the latter is the target of the computation of dMQT, while the former is not.

However, in typical OLAP, one fact table and a plurality of dimension tables are provided, and, usually, the fact table are updated. In this case, the above phenomenon does not occur. Furthermore, such a phenomenon may be allowed, depending on the business activities.

On the contrary, if such a phenomenon is not allowed, this can be coped with by a method described below. A first method is such that, if delta data exists in any base table after dMQT is computed in the above method, the computation is performed again with all the base tables locked. For example, the case of computing dMQT at intervals of ten minutes will be considered. In this case, it is assumed that twenty seconds was required to compute dMQT. If data accumulated for the twenty seconds exists in any delta table, all the base tables are locked, and dMQT is computed again. In this case, since it is a little data accumulated for the twenty seconds that must be processed, the processing ends in a short time (for example, five seconds).

A second method is such that, after performing computation of dMQT in the above method, dMQT is computed again in the same method, and then, if delta data exists in any base table, the computation is performed with all the base tables locked. For example, the case of computing dMQT at intervals of ten minutes will be considered. In this case, it is assumed that twenty seconds was required to compute dMQT. If data accumulated for the twenty seconds exists in any delta table, computation is performed again in the same method. In this case, since it is a little data accumulated for the twenty seconds that must be processed, the processing ends in a short time (for example, five seconds). If data accumulated for five seconds exists in the delta table after the computation ends, dMQT is computed again with all the base tables locked. In this case, since it is a little data accumulated for the five seconds that must be processed, the processing ends in a still shorter time (for example, two seconds).

Specifically, the following is intended by this processing. For example, it is assumed that, in the case where dMQT is computed at the intervals of ten minutes, the following information is added sequentially at substantially the same timing: region information into a region table, product information into a product table, sales information about the added region and existing products and sales information about existing regions and the added product. In this case, it may be undesirable that the phenomenon described with reference to FIG. 10 occurs, with the result that the addition of the sales information about existing regions and the added product is reflected in dMQT earlier and the sales information about the added region and existing products is reflected in dMQT after 10 minutes. Therefore, the addition of sales information about the added region and existing products is picked up in the current dMQT computation and reflected in dMQT.

Figure 11:
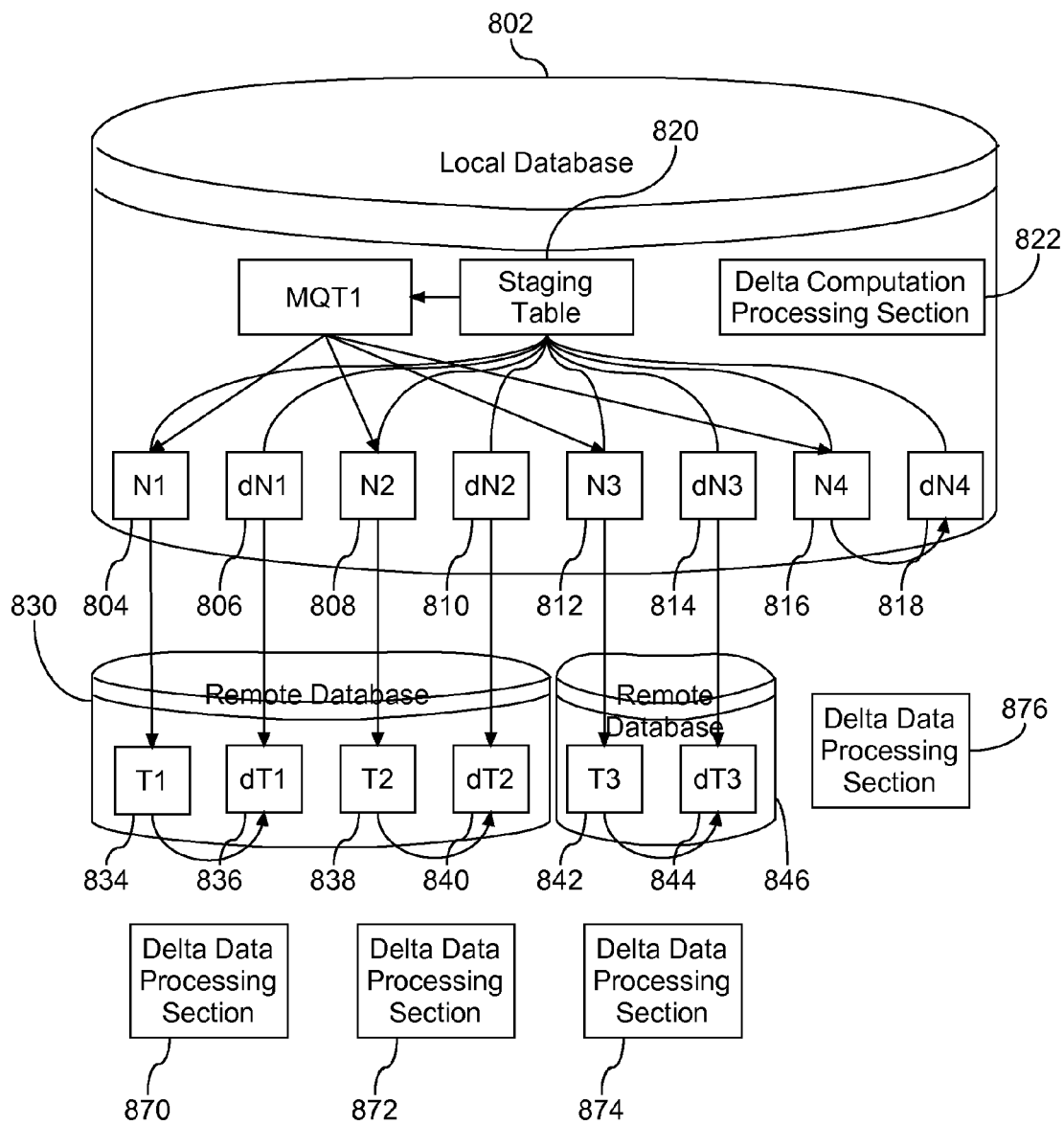
FIG. 11 is a diagram showing a specific example of the configuration of the computer system in the embodiment of the present invention.

Next, description will be made on a specific configuration example of a computer system to which this embodiment can be applied. FIG. 11 shows a specific configuration example of the computer system. This computer system is configured by a local database (802) and remote databases (830) and (846). In the local database (802), there are stored a table to be referred to by the SELECT statement associated with MQT (base table) N1 (804) and a table (delta table) dN1 (806) holding the delta data of N1 (804), a base table N2 (808) and a delta table dN2 (810) corresponding to N2 (808), a base table N3 (812) and a delta table dN3 (814) corresponding to N3 (812), and a base table N4 (816) and a delta table dN4 (818) corresponding to T4 (816).

Here, Tx denotes an actual table, and Nx denotes a virtual table. The virtual table is a table virtually defined in the local database to refer to an actual table existing in the remote database. It is possible to handle the virtual table similarly to the actual table by referring to it by a nickname. Specifically, N1 (804) is a virtual table corresponding to the actual table T1 (834); N2 (808) is a virtual table corresponding to the actual table T2 (838); and N3 (812) is a virtual table corresponding to the actual table T3 (842). In the remote databases (830) and (846), a delta table dTi corresponding to Ti is created, and dNi denotes the virtual table corresponding to the actual table dTi (i=1, 2 and 3).

Moreover, in this computer system, a staging table (820) is provided for the local database (802). This staging table is a table for holding delta of MQT. Furthermore, this computer system is provided with delta data processing sections (870), (872), (874), and (876) for performing processing for inserting delta data of T1 (834) into dT1 (836), processing for inserting delta data of T2 (838) into dT2 (840), processing for inserting delta data of T3 (842) into dT3 (844) and processing for inserting delta data of T4 (816) into dT4 (818), respectively. Besides, the computer system is also provided with a delta computation processing section (822) for computing delta of MQT with the use of the delta tables and so on and inserting the computation result into the staging table.

In this computer system also, the delta table has the following columns in addition to the column of the base table to be used for computing delta of MQT, as described before.
Operationtype
A flag indicating whether data has been added or deleted. Addition is indicated by "1", and deletion is indicated by "−1".
Processflag
A flag indicating whether the data is being computed or unprocessed. Being computed is denoted by "1", and being unprocessed is indicated by "0".
The staging table can be classified into the following two types according to the structure of the SELECT statement associated with MQT.
Staging Table for an Aggregate MQT
A staging table used when the SELECT statement uses aggregate functions such as SUM( ) and COUNT( ). The table has the same columns as MQT.
Staging Table for a Join MQT
A staging table used when the SELECT statement does not use an aggregate function. The table has a column indicating whether data has been added or deleted in addition to the same columns as MQT. That is, similarly to the operation type of the delta table, addition is indicated by "1", and deletion is indicated by "−1".

Next, a description will be made on the flow of the processing performed in the configuration example shown in FIG. 11. The MQT shown in this configuration example holds a result of the SELECT statement which refers to the tables N1, N2, N3 and T4, and it is indicated by the following formula.

$$MQT = N1 \bowtie N2 \bowtie N3 \bowtie T4 \quad \text{(Formula 5)}$$

Here, the delta tables of N1, N2, N3 and T4 are denoted by dN1, dN2, dN3 and dT4. First, description will be made on the flow of the processing performed in the case of "Each delta at once" with reference to the flowchart in FIG. 5. In this configuration example, the delta of MQT about the delta data of N1 is computed first by the i loop for i=1. That is, at (404), the process flag of dN1 is set to "1" to indicate that computation processing is being performed. Then, at (406), N2, N3 and T4 are locked. After that, at step (408), dMQT is obtained from dN1, (N2-dN2), (N3-dN3) and (T4-dT4) and inserted into the staging table. However, as for dN1, only data with the process flag set to "1" is targeted. Last, at (410), the data with the process flag set to "1" in dN1 is deleted, and commitment is made (412).

Next, in the i loop for i=2, the delta of MQT about the delta data of N2 is computed. The computation processing is similar to the case of N1. In this case, however, N1, N3 and T4 are locked, and dMQT is obtained from (N1-dN1), dN2, (N3-dN3) and (T4-dT4) and inserted into the staging table. Furthermore, in the i loop for i=3, the delta of MQT about the delta data of N3 is computed. The computation processing is also similar to the case of N1. In this case, however, N1, N2 and T4 are locked, and dMQT is obtained from (N1-dN1), (N2-dN2), dN3 and (T4-dT4) and inserted into the staging table. Moreover, in the i loop for i=4, the delta of MQT about the delta data of T4 is computed. The computation processing is also similar to the case of N1. In this case, however, N1, N2 and N3 are locked, and dMQT is obtained from (N1-dN1), (N2-dN2), (N3-dN3) and dT4 and inserted into the staging table.

Next, a description will be made on the flow of the processing performed in the case of "One by one" with reference to the flowchart shown in FIG. 8. Here, it is assumed that the tables are referred to in the order of N1, N2, N3 and T4 when dMQT is computed. In this configuration example, the delta of MQT about the delta data of N1 is computed first by the i loop for i=1. That is, at (604), the process flag of dN1 is set to "1" to indicate that computation processing is being performed. Then, a j loop for j=1 is started, and N2 is locked at (612). After that, at (616), computation is performed with the use of dN1 and (N2-dN2), and the result is inserted into a temporary table dN1M1. However, as for dN1, only the data with the process flag set to "1" is targeted. Last, commitment is made at (624). Then, the j loop for j=2 is started, and N3 is locked at (612). After that, at (616), computation is performed with the use of dN1M1 and (N3-dN3), and the result is inserted into a temporary table dN1M2. Last, commitment is made at (624). Furthermore, the j loop for j=3 is started, and T4 is locked at (612). After that, at step (616), computation is performed with the use of dN1M2 and (T4-dT4), and the result is inserted into the staging table. Last, commitment is made at step (624). After that, at (628), the data with the process flag set to "1" in dN1 is deleted, and commitment is made at step (630).

Next, in the i loop for i=2, the delta of MQT about the delta data of N2 is computed. The computation processing is similar to the case of N1. Then, in the i loop for i=3, the delta of MQT about the delta data of N3 is computed. The computation processing is also similar to the case of N1. Moreover, in the i loop for i=4, the delta of MQT about the delta data of T4 is computed. The computation processing is also similar to the case of N1.

An example of SQL for obtaining dMQT will be described below. FIGS. 12*a*, 12, 12*c*, and 12*d* show examples of computation of an aggregate MQT in "Each delta at once". Description will be made on computation of the delta of MQT about the delta data of T1 with the use of an example of holding a result of the SELECT statement which refers to T1, T2 and T3. FIG. 12*a* shows an example of the SELECT statement associated with MQT. By developing a formula for obtaining dMQT about dT1, the formula shown below is obtained. The result is inserted into the staging table. The delta tables holding the delta data of T1, T2 and T3 are denoted by dT1, dT2 and dT3, respectively.

$$\begin{aligned}dMQT &= dT1 \bowtie (T2 - dT2) \bowtie (T3 - dT3) \quad \text{(Formula 6)}\\ &= dT1 \bowtie T2 \bowtie T3 - dT1 \bowtie dT2 \bowtie T3 - \\ &\quad dT1 \bowtie T2 \bowtie dT3 + dT1 \bowtie dT2 \bowtie dT3\end{aligned}$$

Among the tables constituting the developed formula, the table of the first term can be obtained by the SQL statement shown in FIG. 12*b*. This SQL statement is obtained by converting the SELECT statement associated with MQT in accordance with the following rule.
T1 in the SELECT statement associated with MQT is replaced with dT1.
As for SUM, data with the operation type set to "1" (addition) is added, and data with the operation type set to "−1" (deletion) is subtracted (multiplied by "−1").
As for COUNT or COUNT_BIG, "1" is added in the case of data with the operation type set to "1" (addition), and "1" is subtracted in the case of data with the operation type set to "−1" (deletion). Since the data type of COUNT_BIG is DECIMAL, the data is converted to DECIMAL type data with the DECIMAL function.
Since data to be processed in the delta table is with the process flag set to "1", by using this as a condition, it is added.

Among the tables constituting the developed formula, the table of the second term (including a minus sign) can be obtained by the SQL statement shown in FIG. 12c. This SQL statement is obtained by converting the SELECT statement associated with MQT in accordance with the following rule.

T1 and T2 in the SELECT statement associated with MQT are replaced with dT1 and dT2, respectively.

Two delta tables exist, and each holds an operation type. Therefore, if the product of the two operation types is positive, it is added, and if the product is negative, it is subtracted. Furthermore, since it is necessary to subtract the result, addition and subtraction are reversely performed.

Other points are to be treated by taking the same approach as in the case of one delta table.

Moreover, among the tables constituting the developed formula, the table of the third term (including a minus sign) can be also obtained by the SQL statement converted in accordance with a similar rule.

Among the tables constituting the developed formula, the table of the fourth term can be obtained by the SQL statement shown in FIG. 12d. In this case, three delta tables are used. However, this SQL statement can also be obtained by performing conversion similar to the case of using one delta table or the case of using two delta tables.

FIGS. 13a, 13b, and 13c show examples of computation of an aggregate MQT in "One by one". Description will be made on computation of the delta of MQT about the delta data of T1 with the use of an example similar to the case of "Each delta at once". FIG. 13a shows an example of the SELECT statement associated with MQT. By developing the formula for obtaining dMQT about dT1, the following formula is obtained.

$$dMQT = dT1 \bowtie (T2-dT2) \bowtie (T3-dT3) \quad \text{(Formula 7)}$$

If dT1 and T2 are computed first:

$$dT1M1 = dT1 \bowtie (T2-dT2)$$
$$= dT1 \bowtie T2 - dT1 \bowtie dT2$$
$$dMQT = dT1M1 \bowtie (T3-dT3)$$
$$= dT1M1 \bowtie T3 - dT1M1 \bowtie dT3$$

In this case, there are two methods for obtaining dMQT. One is a method in which, after storing a temporary table based on dT1 and T2 in dT1M1, dMQT is obtained on the basis of dT1M1 and T3. The other is a method in which, after storing a temporary table based on dT1 and T3 in dT1M1, dMQT is obtained on the basis of dT1M1 and T2. However, this embodiment does not limit the order of processing. Here, description will be made on the method in which computation based on dT1 and T2 is performed first.

The temporary table based on dT1 and T2 can be obtained by the SQL statement shown in FIG. 13b. This SQL statement is obtained by converting the SELECT statement associated with MQT in accordance with the following rule.

Portions about T1 and T2 are extracted from the SELECT statement associated with MQT. COUNT and COUNT_BIG also relate to T1 and T2, and therefore, they are also extracted. As for conditions and the like for which columns of T1 and T2 are used with those of other tables, the columns of T1 and T2 are projected and added to GROUP BY. In this example, T1.C7=T3.C7 is the case. Therefore, this condition is deleted; T1.C7 is projected and added to GROUP BY. Since T1.OPERATIONTYPE is used to obtain SUM of T3.C6, this is also projected and added after GROUP BY.

Other points are to be treated by taking the same approach as in the case of "Each delta at once".

The table based on dT1M1 and T3 can be obtained by the SQL statement shown in FIG. 13c. This SQL statement is obtained by converting the SELECT statement associated with MQT in accordance with the following rule.

Portions about dT1M1 (T1 and T2) and T3 are extracted from the SELECT statement associated with MQT.

Portions for which evaluation has been made in the above-described processing based on dT1 and T2 are deleted. In this case, T1.C7=T2.C7 and T1.PROCESSFLAG=1 in the WHERE clause are deleted. Since evaluation of T1.OPERATIONTYPE related to S1, S2 and C has been already made, evaluation is not performed for T1.OPERATIONTYPE but performed only for SUM.

T1 and T2 are changed to dT1M1.

Other points are to be treated by taking the same approach as in the case of the above-described processing based on dT1 and T2.

FIG. 14 shows an example of computing a join MQT in "Each delta at once". Description will be made on computation of the delta of MQT about the delta data of T1 with the use of an example of holding a result of the SELECT statement which refers to T1, T2 and T3. FIG. 14(a) shows an example of the SELECT statement associated with MQT. By developing the formula for obtaining dMQT about dT1, the formula shown below is obtained. The result is inserted into the staging table. The delta tables holding the delta data of T1, T2 and T3 are denoted by dT1, dT2 and dT3, respectively.

$$dMQT = dT1 \bowtie (T2-dT2) \bowtie (T3-dT3) \quad \text{(Formula 8)}$$
$$= dT1 \bowtie T2 \bowtie T3 - dT1 \bowtie dT2 \bowtie T3 -$$
$$dT1 \bowtie T2 \bowtie dT3 + dT1 \bowtie dT2 \bowtie dT3$$

Among the tables constituting the developed formula, the table of the first term can be obtained by the SQL statement shown in FIG. 14b. This SQL statement is obtained by converting the SELECT statement associated with MQT in accordance with the following rule.

T1 in the SELECT statement associated with MQT is replaced with dT1.

The staging table for the join MQT holds an operation type similarly to the delta tables. If one delta table is used, the value of the operation type of the delta table is used as the value of the operation type of the staging table. If the operation type is defined in the last column of the staging table, the computation expression shown in FIG. 14b is satisfied.

Since data to be processed in the delta table is with the process flag set to "1", it is added as a condition.

Among the tables constituting the developed formula, the table of the second term (including a minus sign) can be obtained by the SQL statement shown in FIG. 14c. This SQL statement is obtained by converting the SELECT statement associated with MQT in accordance with the following rule.

T1 and T2 in the SELECT statement associated with MQT are replaced with dT1 and dT2, respectively.

Taking the same approach as in the case of the aggregate MQT, if the product of the operation types of dT1 and dT2 is positive, the value of the operation type of the staging table is set to "1" (addition). If the product is negative, the value is set to "−1" (deletion). Furthermore, since it is necessary to subtract the result, addition and subtraction are reversely performed.

Other points are to be treated by taking the same approach as in the case of one delta table.

Furthermore, among the tables constituting the developed formula, the table of the third term (including a minus sign) can be also obtained by the SQL statement converted in accordance with a similar rule.

Among the tables constituting the developed formula, the table of the fourth term can be obtained by the SQL statement shown in FIG. 14d. In this case, three delta tables are used. However, this SQL statement can also be obtained by performing conversion similar to the case of using one delta table or the case of using two delta tables.

FIG. 15 shows an example of computing a join MQT in "One by one". Description will be made on computation of the delta of MQT about the delta data of T1 with the use of an example similar to the case of "Each delta at once". FIG. 15a shows an example of the SELECT statement associated with MQT. By developing the formula for obtaining dMQT about dT1, the formula shown below is obtained.

$$d\text{MQT}=dT1 \bowtie (T2-dT2) \bowtie (T3-dT3) \quad \text{(Formula 9)}$$

If dT1 and T2 are computed first:

$$dT1M1 = dT1 \bowtie (T2 - dT2)$$
$$= dT1 \bowtie T2 - dT1 \bowtie dT2$$
$$dMQT = dT1M1 \bowtie (T3 - dT3)$$
$$= dT1M1 \bowtie T3 - dT1M1 \bowtie dT3$$

In this case, there are two methods for obtaining dMQT. One is a method in which, after storing a temporary table based on dT1 and T2 in dT1M1, dMQT is obtained on the basis of dT1M1 and T3. The other is a method in which, after storing a temporary table based on dT1 and T3 in dT1M1, dMQT is obtained on the basis of dT1M1 and T2. However, this embodiment does not limit the order of processing. Here, description will be made on the method in which computation based on dT1 and T2 is performed first.

The temporary table based on dT1 and T2 can be obtained by the SQL statement shown in FIG. 15b. This SQL statement is obtained by converting the SELECT statement associated with MQT in accordance with the following rule.

Portions about T1 and T2 are extracted from the SELECT statement associated with MQT.

As for conditions and the like for which columns of T1 and T2 that are used with those of other tables, the columns of T1 and T2 are projected. In this example, T1.C4=T3.C4 is the case. Therefore, this condition is deleted, and T1.C4 is projected.

Other points are to be treated by taking the same approach as in the case of "Each delta at once".

The table based on dT1M1 and T3 can be obtained by the SQL statement shown in FIG. 15c. This SQL statement is obtained by converting the SELECT statement associated with MQT in accordance with the following rule.

Portions about dT1M1 (T1 and T2) and T3 are extracted from the SELECT statement associated with MQT.

Portions for which evaluation has been made in the above-described processing based on dT1 and T2 are deleted. In this case, T1.C4=T2.C4 and T1.PROCESSFLAG=1 in the WHERE clause are deleted.

T1 and T2 are changed to dT1M1.

Other points are to be treated by taking the same approach as in the case of the above-described processing based on dT1 and T2.

Next, description will be made on the result of the experiment of measuring the time for computing dMQT and the time for locking the tables according to this embodiment. FIGS. 16a, 16b, and 16c show the result of the experiment of computing an aggregate MQT. FIG. 16a shows correspondence between databases and tables. In this experiment, such an environment is used in which a plurality of tables is arranged in a distributed manner in a plurality of databases. The aggregate MQT is created in a federation server. In the diagram, the tables being referred to by the aggregate MQT are underlined.

Under this environment, 300 lines and 1159 lines are added and deleted in the tables "ORDERS" and "LINEITEM", respectively, and then MQT is refreshed in the experiment. As a result, the time for computing dMQT, the time for locking the table "ORDERS" and the time for locking the table "LINEITEM" are as shown in FIG. 16b. The "addition of data" column for "lock of ORDERS" in "Each delta at once" shows 4.0 seconds. Since it is necessary to lock the table for 6.3 seconds currently, the time required for locking the table has been shortened by this embodiment. Furthermore, the "addition of data" column for "lock of ORDERS" in "One by one" show 0.16 seconds, meaning the lock time could be shortened in comparison with the current lock time. The SELECT statement of the aggregate MQT used in this experiment is shown in FIG. 16c.

FIGS. 17a, 17b, and 17c show the result of the experiment of computing the join MQT. FIG. 17a shows correspondence between databases and tables. In this experiment, such an environment is used in which a plurality of tables is arranged in a distributed manner in a plurality of databases. The join MQT is created in a federation server. In the diagram, the tables being referred to by the join MQT are indicated by being underlined.

Under this environment, 300 lines and 1159 lines are added and deleted in the tables "ORDERS" and "LINEITEM", respectively, and then MQT is refreshed in the experiment. As a result, the time for computing dMQT, the time for locking the table "ORDERS" and the time for locking the table "LINEITEM" are as shown in FIG. 17b. The SELECT statement of the join MQT used in this experiment is shown in FIG. 17c.

Figure 18:
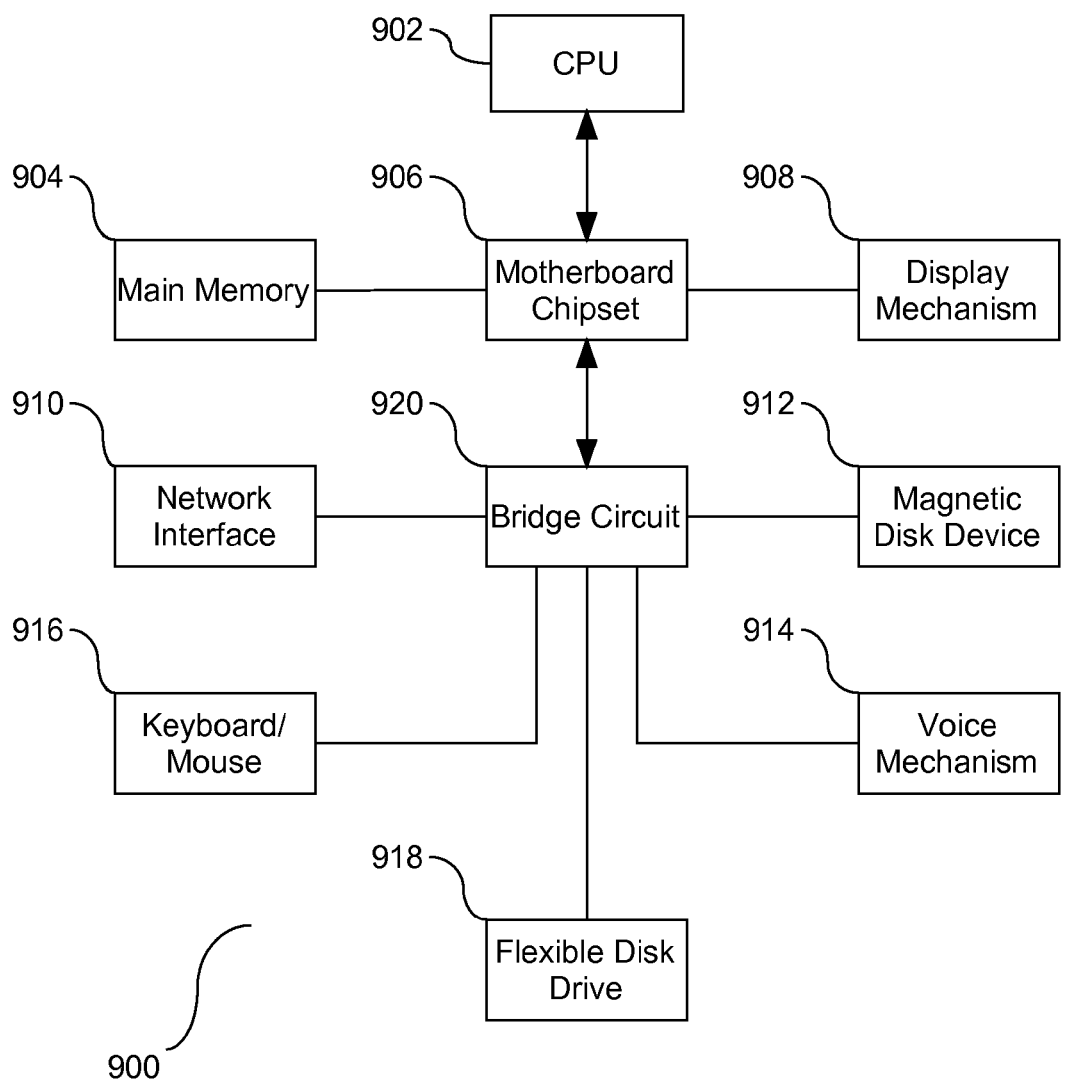
FIG. 18 is a diagram showing the hardware configuration of a computer to which the embodiment of the present invention can be applied.

Lastly, description will be made on a computer hardware configuration preferred for applying this embodiment. FIG. 18 shows an example of such computer hardware configuration (900). As shown in the diagram, the computer is provided with a CPU (902), which is computation means, a main memory (904) connected to the CPU (902) via a mother board chip set (906), and a display mechanism (908) which is also connected to the CPU (902) via the mother board chip set (906). To the mother board chip set (906), there are connected a network interface (910), a magnetic disk device (912), a voice mechanism (914), a keyboard/mouse (916), and a flexible disk drive (918) via a bridge circuit (920).

In FIG. 18, the respective components are connected with one another via buses. For example, between the CPU (902) and the mother board chip set (906) and between the mother board chip set (906) and the main memory (904), a CPU bus is used to connect them. The mother board chip set (906) and the display mechanism (908) may be connected to each other via an AGP (accelerated graphics port). However, if the display mechanism (908) includes a video card for PCI Express, the mother board chip set (906) and this video card are connected via a PCI Express (PCIe) bus. With respect to connection to the bridge circuit (920), PCI Express, for example, can be used for the network interface (910). As for the HDD (912), Serial ATA (AT Attachment), Parallel ATA or PCI (Peripheral Components Interconnect), for example, can be used. Furthermore, as for the keyboard/mouse (916) and the flexible disk drive (918), USB (Universal Serial Bus) can be used.

All of the present invention may be realized by hardware or by software. It is also possible to realize all of the present invention by both hardware and software. Furthermore, the present invention can be realized as a computer, a data processing system or a computer program. The computer program can be stored in a computer-readable medium and provided. As the medium, an electronic, magnetic, optical, electromagnetic, infrared or semiconductor system (apparatus or equipment) or a transmission medium is conceivable. As the computer-readable medium, a semiconductor, solid-state storage device, magnetic tape, removable computer diskette, random access memory (RAM), read-only memory (ROM), rigid magnetic disk and optical disk can be given as examples. Examples of the optical disk at present include a compact disc read-only memory (CD-ROM), a compact disc read/write (CD-R/W) and a DVD.

As described above, in this embodiment, computation for reflecting only the delta data of different base tables in the delta of a summary table is performed in a different transaction. Thereby, the time for locking the base tables to perform incremental refresh of the summary table is shortened. Especially, by performing incremental refresh of MQT with the use of a plurality of transactions in a distributed database environment, it is possible to reduce the influence on business activities.

Advantages Over the Prior Art

According to the present invention, the time for locking base tables to perform incremental refresh of a summary table is mitigated.

Alternative Embodiments

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. An apparatus to refresh a summary table that stores results of a query to a plurality of base tables, the apparatus comprising:
a manager to modify multiple base tables among said plurality of base tables between consecutive updates to said summary table and prior to a predetermined time point;
a generator configured to generate delta information for each of said modified base tables to reflect in the summary table changes made before the predetermined time point in the multiple modified base tables, wherein said changes are reflected in the summary table in multiple transactions, one transaction for each modified base table, wherein each transaction corresponds to a different specified modified table designated among the modified tables, wherein the specified modified base table is permitted to be changed after the predetermined time point concurrent with a transaction refreshing the summary table for said specified base table and other base tables are prevented from being changed while changes are reflected in the summary table; and
a controller configured to control the generator to generate delta information for the summary table by a different transaction when a different base table is specified among the multiple modified base tables.

2. The apparatus according to claim 1, wherein the generator is configured to generate the delta information for the summary table in one transaction for each specified table by referral to the modified base tables except the specified base table, when any one of said the base tables except the specified base table is prevented from being changed.

3. The apparatus according to claim 1, wherein the generator is configured to generate the delta information by selection of a base table from among all the plurality of base tables except the specified base table, one by one, and to perform processing that refers to the selected base table by one transaction, in a situation where the selected base table is prevented from being changed.

4. The apparatus according to claim 1, wherein the generator is configured to enable the specified base table to be changed after a predetermined time point by distinguishing changes made before the predetermined time point from changes made after the predetermined time point to manage changes during generation of the delta information, in an area for managing changes made in the specified base table.

5. The apparatus according to claim 1, wherein the generator is configured to enable the specified base table to be changed after the predetermined time point by stopping processing for managing changes made after the predetermined time point in an area for managing changes made in the specified base table during generation of the delta information.

6. A method for refreshing a summary table that stores results of queries to a plurality of base tables, the method comprising:
modifying multiple base tables among said plurality of base tables between consecutive updates to said summary table and prior to a predetermined time point;
identifying changes made before the predetermined time point in a specified base table among a plurality of modified base tables;
preventing the modified base tables, except the specified modified base table, from being changed while changes are reflected in the summary table;
reflecting the changes identified in the identification step in the summary table by referring to the base tables prevented from being changed, wherein said changes are reflected in the summary table in multiple transactions, one transaction for each modified base table, wherein each transaction corresponds to a different specified modified table designated among the modified tables, wherein the specified modified base table is permitted to be changed after the predetermined time point concurrent with a transaction refreshing the summary table for said specified table; and
permitting changes of the previously prevented modified base table after the summary table is refreshed with respect to the specified modified base table.

7. The method according to claim 6, wherein the step of generating delta information for reflecting changes in the summary table changes made after the predetermined time point includes distinguishing changes identified at the identification step from changes made in the specified base table after the predetermined time point.

8. A method for refreshing a summary table that stores results of queries to a plurality of base tables, the method comprising:
- modifying multiple base tables among said plurality of base tables prior to a predetermined time point;
- identifying changes made before the predetermined time point in a first base table of the plurality of modified base tables;
- preventing a second base table among the plurality of base tables from being changed; generating delta information for reflecting the changes identified in the identification step in the summary table by referring to the second base table in a situation where the first base table is permitted to be changed after the predetermined time point while refreshing the summary table;
- permitting changes of the second base table;
- preventing a third base table among the plurality of base tables from being changed while changes are reflected in the summary table;
- updating the delta information by referencing the third base table; and
- permitting changes of the third base table.

9. The method according to claim 8, wherein the generation step permits changes made after the predetermined time point by managing to distinguish the changes identified in the identification step from the changes made in the first base table after the predetermined time point.

10. A computer program product comprising a computer readable storage medium including a computer readable program, wherein the computer readable program when executed on a computer causes the computer to:
- modify multiple base tables between consecutive updates to said summary table and prior to a predetermined time point;
- prevent the modified base tables, except a specified modified base table, from being changed while changes are reflected in the summary table;
- generate delta information for each of said modified base tables for reflecting in a summary table changes made before the predetermined time point in the multiple modified base tables, wherein said changes are reflected in the summary table in multiple transactions, one transaction for each modified base table, wherein it is possible to change the specified modified base table after the predetermined time point while refreshing the summary table for said specified table; and
- control delta information for the summary table to be generated by a different transaction when a different base table is specified.

11. The computer program product according to claim 10, wherein the instructions to generate delta information is configured to generate the delta information for the summary table by one transaction for each specified table by referring to the modified base tables except the specified base table, in a situation where any of all the base tables except the specified base table is prevented from being changed.

12. The computer program product according to claim 10, wherein the instructions to generate delta information is configured to generate the delta information by selecting a base table from among all the plurality of base tables except the specified base table, one by one, and performing processing that refers to the selected base table by one transaction, in a situation where the selected base table is prevented from being changed.

13. The computer program product of claim 10, wherein the instructions to generate delta information enables the specified base table to be changed after the predetermined time point by further instructions to distinguish changes made before the predetermined time point from changes made after the predetermined time point to manage the changes during generation of the delta information, in an are for managing changes made in the specified base table.

14. The computer program product of claim 10, wherein the instructions to generate delta information enables the specified base table to be changed after the predetermined time point by stopping processing to manage changes made after the predetermined time point in an area for managing changes made in the specified base table during generation of the delta information.

* * * * *